(12) United States Patent
Rawdon et al.

(10) Patent No.: US 9,428,284 B2
(45) Date of Patent: Aug. 30, 2016

(54) CARGO CONTAINER TRANSFER SYSTEM AND METHOD

(71) Applicant: The Boeing Company, Chicago, IL (US)

(72) Inventors: Blaine Knight Rawdon, San Pedro, CA (US); Matthew Jonathan Segal, Calabasas, CA (US)

(73) Assignee: The Boeing Company, Chicago, IL (US)

( * ) Notice: Subject to any disclaimer, the term of this patent is extended or adjusted under 35 U.S.C. 154(b) by 402 days.

(21) Appl. No.: 13/906,510

(22) Filed: May 31, 2013

(65) Prior Publication Data

US 2014/0356110 A1    Dec. 4, 2014

(51) Int. Cl.
*B60P 1/64* (2006.01)
*B65G 63/02* (2006.01)
*B64F 1/32* (2006.01)
*B65G 69/24* (2006.01)

(52) U.S. Cl.
CPC .............. *B64F 1/32* (2013.01); *B60P 1/6427* (2013.01); *B60P 1/6481* (2013.01); *B65G 63/025* (2013.01); *B65G 69/24* (2013.01)

(58) Field of Classification Search
CPC  B65D 88/129; B65G 63/004; B65G 63/025; B65G 69/24; B60P 1/52; B60P 1/6427; B60P 1/6481
See application file for complete search history.

(56) References Cited

U.S. PATENT DOCUMENTS

| | | | |
|---|---|---|---|
| 3,159,111 A | 12/1964 | Gutridge | |
| 3,228,542 A * | 1/1966 | Achammer | B60P 1/52 414/373 |
| 3,612,315 A * | 10/1971 | Blackburn | B60P 1/6427 254/45 |
| 4,049,135 A * | 9/1977 | Glassmeyer | B65D 88/126 108/55.1 |
| 4,077,532 A | 3/1978 | Bryan | |
| 4,306,830 A | 12/1981 | le Duc | |
| 4,984,962 A * | 1/1991 | Jarvinen | B60P 1/52 193/35 SS |
| 5,140,716 A | 8/1992 | Rawdon et al. | |
| 5,184,366 A | 2/1993 | Rawdon et al. | |
| 5,241,722 A | 9/1993 | Rohrlick et al. | |
| 5,253,381 A | 10/1993 | Rawdon et al. | |
| 5,467,827 A * | 11/1995 | McLoughlin | A62C 27/00 137/355.17 |
| 6,210,088 B1 | 4/2001 | Crosby | |
| 6,427,947 B1 | 8/2002 | Rohrlick et al. | |
| 6,547,181 B1 | 4/2003 | Hoisington et al. | |

(Continued)

FOREIGN PATENT DOCUMENTS

EP         2 079 607         7/2010

OTHER PUBLICATIONS

International Search Report and Written Opinion dated Sep. 16, 2014 from International Application No. PCT/US2014/032861.

*Primary Examiner* — James Keenan
(74) *Attorney, Agent, or Firm* — Baldauff IP, LLC; Michael J. Baldauff, Jr.

(57) ABSTRACT

The present disclosure is generally directed to a cargo transfer system, a method of transferring cargo containers, and a method of handling cargo containers including a cargo transfer pallet capable of supporting a plurality of cargo containers thereon, a cargo loader vehicle capable of receiving the cargo transfer pallet thereon, and a cargo staging structure capable of receiving the cargo transfer pallet thereon and capable of receiving the cargo loader vehicle therein such that the cargo transfer pallet is supported by the cargo staging structure over at least a portion of the cargo loader vehicle.

19 Claims, 25 Drawing Sheets

(56) References Cited

U.S. PATENT DOCUMENTS

| | | |
|---|---|---|
| 6,722,610 B1 | 4/2004 | Rawdon et al. |
| 6,848,650 B2 | 2/2005 | Hoisington et al. |
| 7,095,364 B1 | 8/2006 | Rawdon et al. |
| 7,467,783 B2 | 12/2008 | Rawdon |
| 7,534,082 B2 | 5/2009 | Rawdon et al. |
| 7,641,177 B2 | 1/2010 | Rawdon |
| 7,891,608 B2 | 2/2011 | Rawdon et al. |
| 8,128,064 B2 * | 3/2012 | Franzen ................ B60P 1/6445 254/2 C |
| 2002/0005150 A1 | 1/2002 | Taylor |
| 2008/0219827 A1 * | 9/2008 | Lanigan .................. B61B 1/005 414/792.8 |
| 2010/0213430 A1 | 8/2010 | Franzen et al. |

* cited by examiner

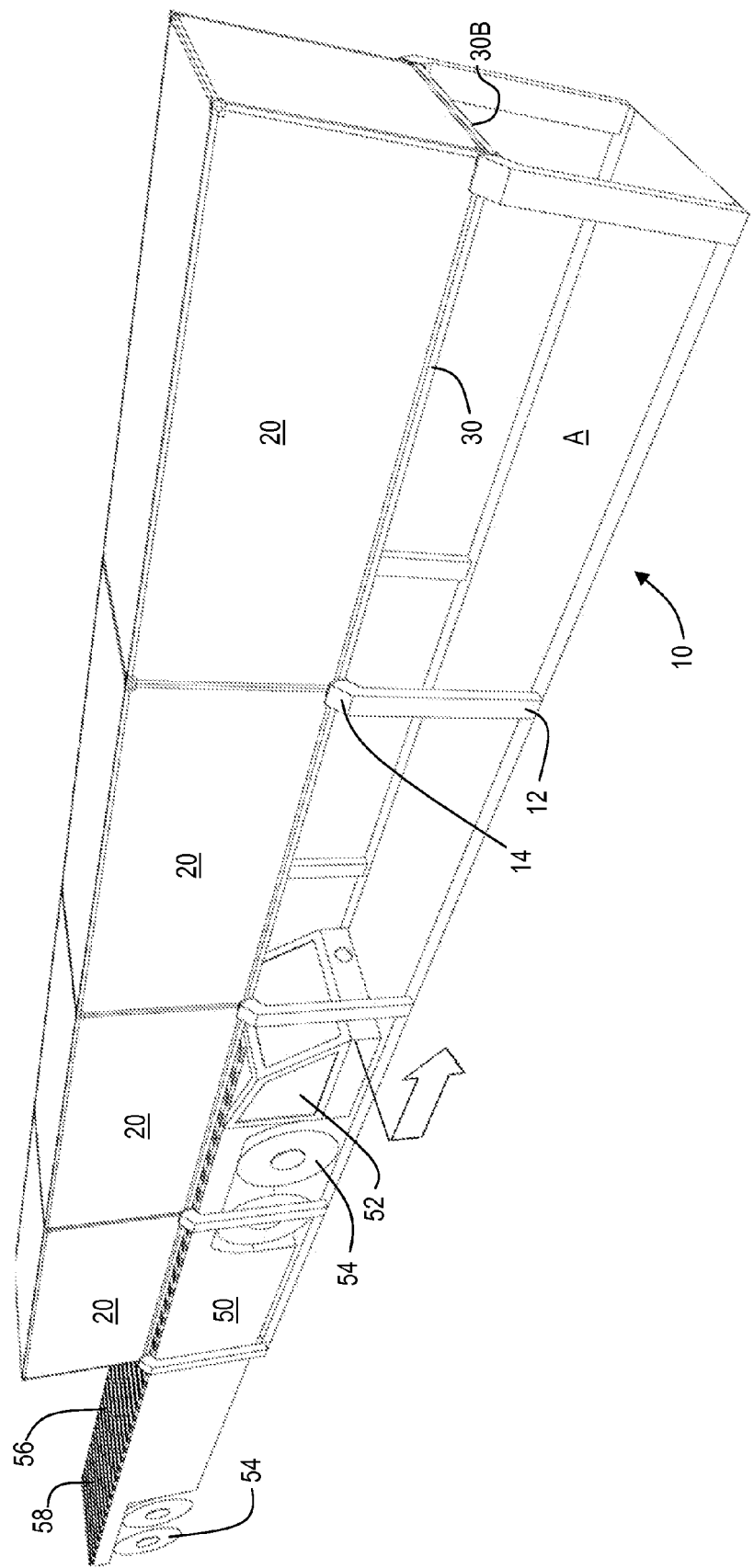

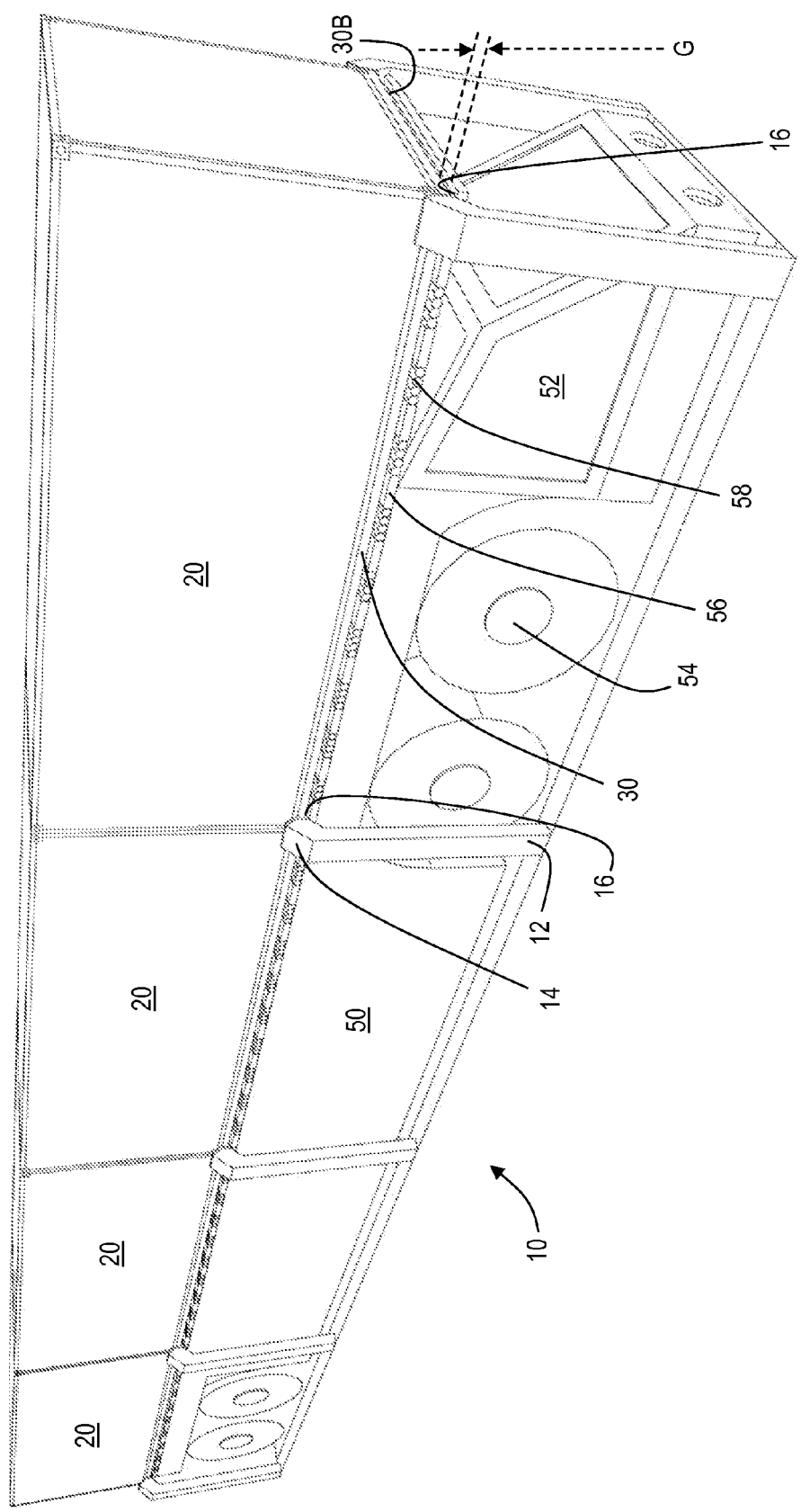

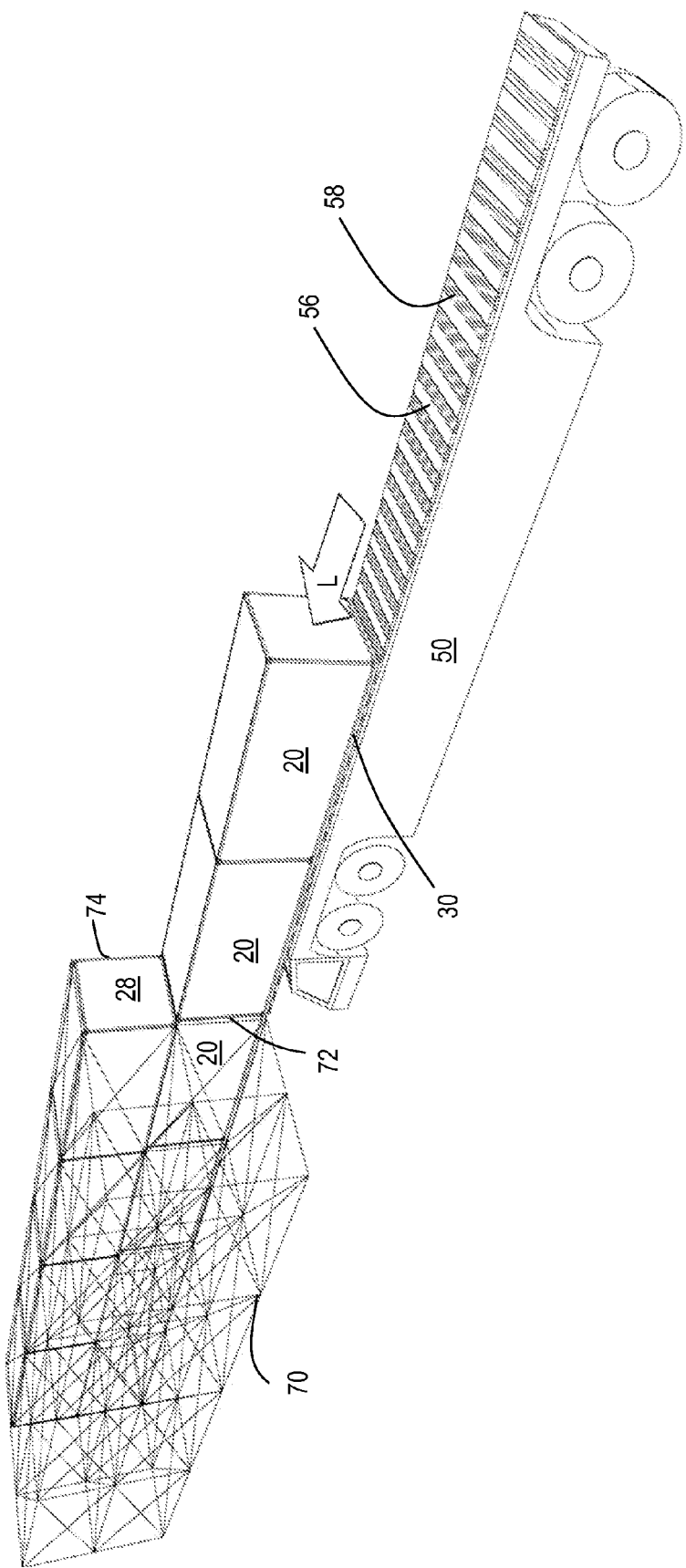

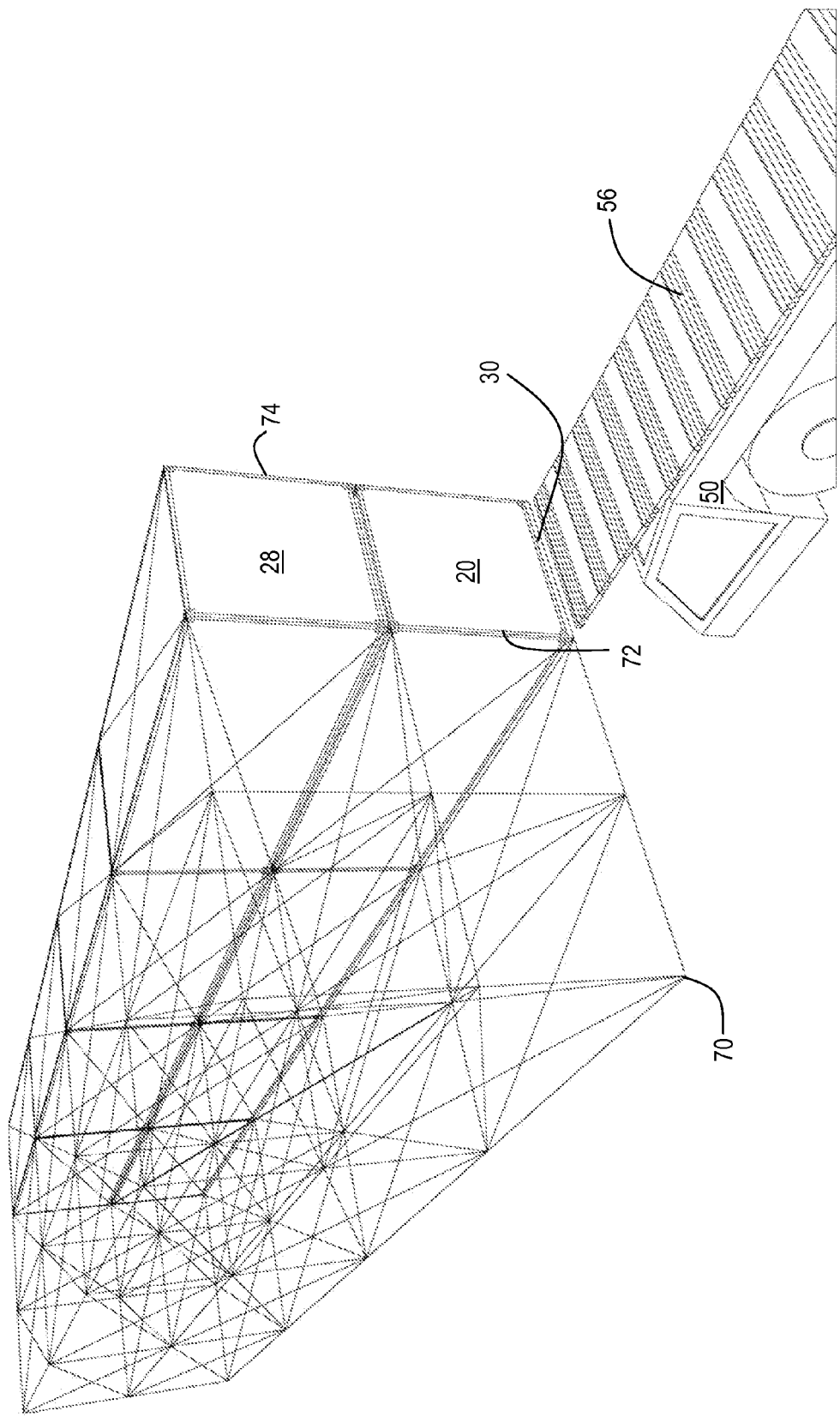

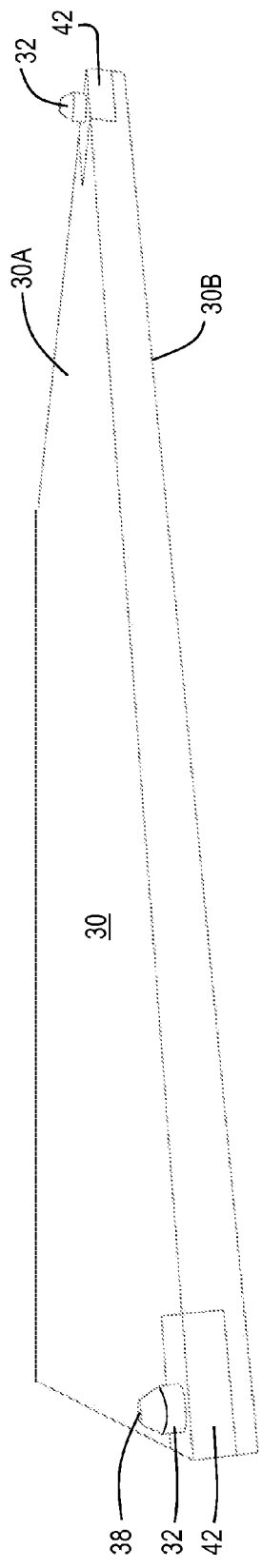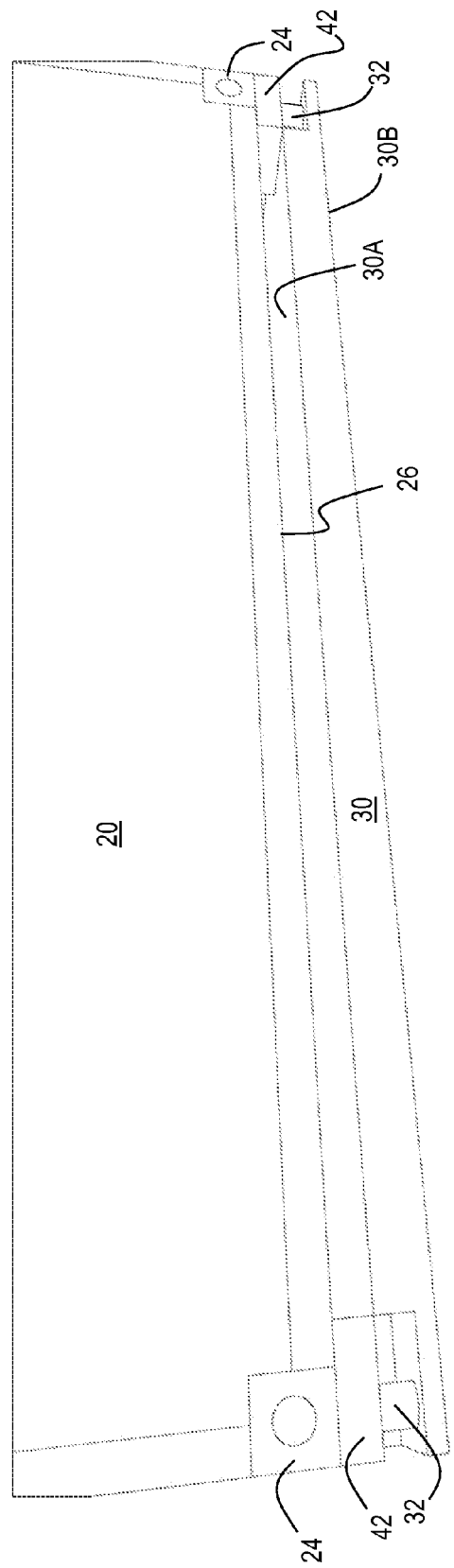
FIG. 14A
FIG. 14B

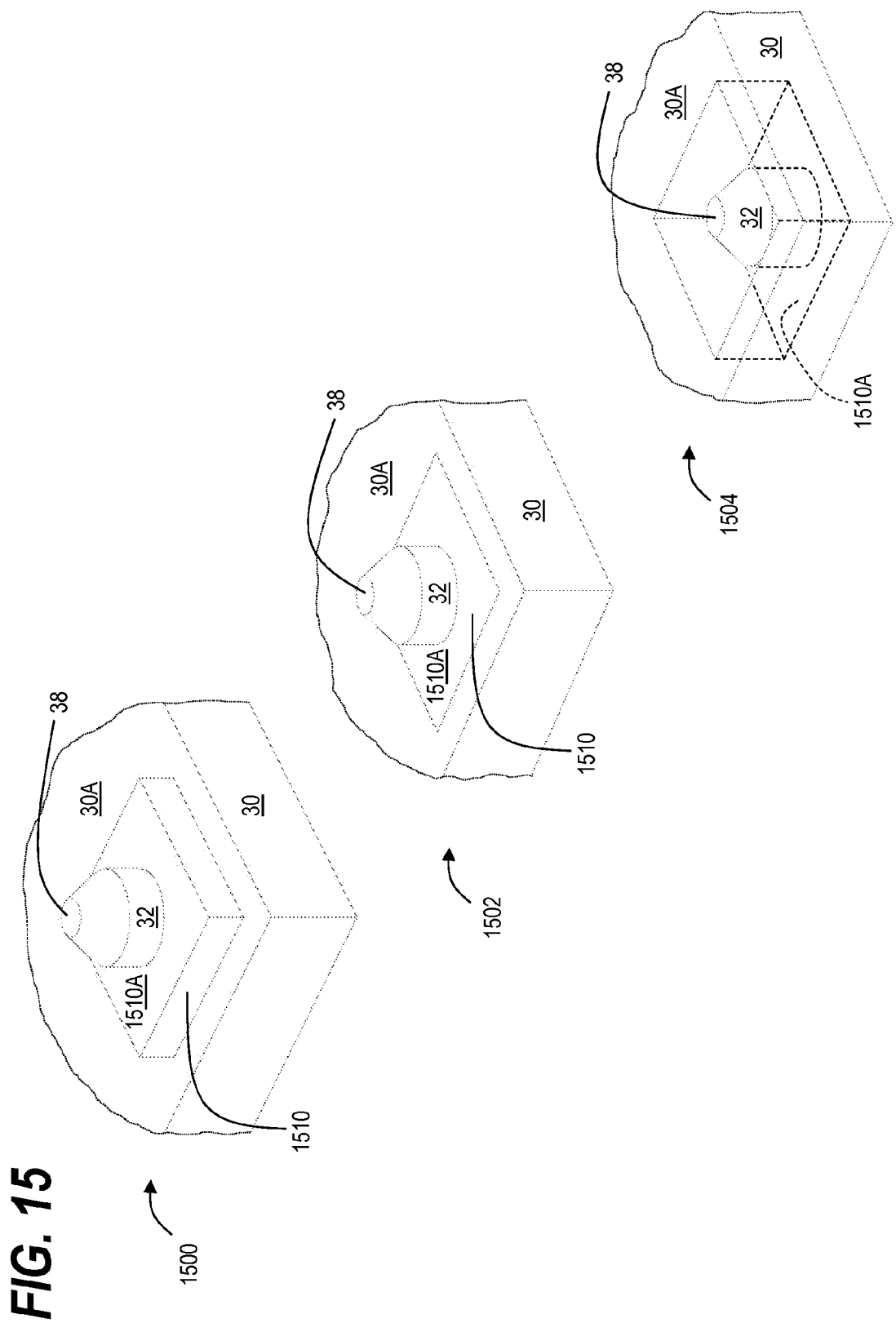

CARGO CONTAINER TRANSFER SYSTEM AND METHOD

FIELD

The configurations presented herein are directed toward a system and method of loading and unloading of cargo containers.

BACKGROUND

The basic problem addressed by the configurations presented herein pertains to loading and unloading of dedicated cargo transportation vehicles with International Standards Organization (ISO) specified intermodal containers.

Asynchronous scheduling between air cargo and surface transportation modes is problematic when ISO containers arrive at and depart from airports via air or a surface transport mode, typically truck transport. Precise synchronization of these modes is practically impossible. As a result, cargo is usually stored for some period during the transfer from one mode to another.

Rapid airplane loading and unloading is advantageous since this reduces the period of unproductive time the airplane spends on the ground and increases its productive time in the air. The benefit of rapid loading must be balanced against the cost of the loading system and the labor hours needed.

Existing solutions typically handle only one container at a time, and containers are not staged on pallets or even yard trucks before the vehicle's (ship or train) arrival. Containers are loaded onto trains, trucks and ships from a vertical direction (they are lowered) as opposed to being inserted longitudinally, and containers are not pre-registered (geometrically) so as to automatically align with the vehicle's cargo restraint system. Furthermore, no system is provided to permit a transport vehicle to drive in underneath staged containers.

In the commercial air cargo world, ISO containers are rarely ever carried, and when they are, air cargo containers and/or pallets are loaded one or two at a time, where air cargo containers and/or pallets are stored in order of loading to facilitate the loading. However, loading devices (cargo loader vehicles) are not pre-staged. Instead, containers are moved in order to (typically) a single main deck cargo loader vehicle where they are loaded one or two at a time.

It is with respect to these and other considerations that the configurations herein are presented to enable ISO containers to be loaded into an airplane or other transportation vehicles more quickly than existing systems, and also enable a very large and heavy payload to be loaded and secured within an airplane or transportation vehicle more quickly. There needs to be a method that requires less labor per unit load than existing air cargo systems, by reducing the time spent storing and moving air cargo containers and pallets. Furthermore, the storage of cargo containers may take place outdoors where typically existing air cargo is stored indoors in a costly facility.

SUMMARY

It should be appreciated that this Summary is provided to introduce a selection of concepts in a simplified form that are further described below in the Detailed Description. This Summary is not intended to be used to limit the scope of the claimed subject matter.

In one configuration disclosed herein, a cargo transfer system includes a cargo transfer pallet capable of supporting a plurality of cargo containers thereon, a cargo loader vehicle capable of receiving the cargo transfer pallet thereon, and a cargo staging structure capable of receiving the cargo transfer pallet thereon and capable of receiving the cargo loader vehicle therein such that the cargo transfer pallet is supported by the cargo staging structure over at least a portion of the cargo loader vehicle.

In another configuration disclosed herein, a method of transferring cargo containers includes providing a cargo transfer pallet capable of supporting a plurality of cargo containers thereon, and a cargo staging structure capable of receiving the cargo transfer pallet thereon. The cargo transfer pallet is positioned on opposing support members of the cargo staging structure and a cargo container is loaded on the cargo transfer pallet. A cargo loader vehicle is positioned within the cargo staging structure and under a portion of the cargo transfer pallet, and a powered translation support bed is raised by an elevating mechanism, the support bed being disposed on an upper portion of the cargo loader vehicle to contact an underside of the cargo transfer pallet and raise the cargo transfer pallet and the cargo container thereon above the cargo staging structure. The cargo loader vehicle carrying the cargo transfer pallet and the cargo container thereon is then driven or removed from the cargo staging structure.

In another configuration disclosed herein, a method of handling cargo containers within a multiple-container storage structure includes positioning a cargo transfer vehicle carrying a cargo transfer pallet with a first cargo container thereon before a first cargo container storage opening in the multiple-container storage structure. A powered translation support bed disposed on an upper portion of the cargo transfer vehicle is operated to linearly move the cargo transfer pallet and the one first cargo container thereon into the first cargo container storage opening of the multiple-container storage structure. The first cargo container is received within the multiple-container storage structure on the cargo transfer pallet, and corner fittings of the first cargo container are engaged with a multiple-container storage structure retention system. The cargo transfer pallet is then released from an underside of the first cargo container within the multiple-container storage structure, and the cargo transfer pallet is then translated out of the multiple-container storage structure and onto the powered translation support bed of the cargo transfer vehicle under powered control of a powered translation multiple-container storage structure mechanism.

The features, functions, and advantages that have been discussed can be achieved independently in various configurations of the present disclosure or may be combined in yet other configurations, further details of which can be seen with reference to the following description and drawings.

BRIEF DESCRIPTION OF THE DRAWINGS

The configurations presented herein will become more fully understood from the detailed description and the accompanying drawings, wherein:

FIG. 4 illustrates the at least one configuration disclosed herein according to the cargo transfer system of FIGS. 1-3;

FIG. 5 illustrates the at least one configuration disclosed herein according to the cargo transfer system of FIGS. 1-4;

FIG. 10 illustrates at least one configuration disclosed herein according to a method of transferring cargo containers to and from a multiple-container storage structure of FIG. 9;

FIG. 11 illustrates at least one configuration disclosed herein according to a method of transferring cargo containers to and from a multiple-container storage structure of FIGS. 9-10;

FIGS. 14A-14B illustrate at least one alternative configuration disclosed herein according to a method of transferring cargo containers to and from a multiple-container storage structure of FIGS. 9-13;

FIG. 15 illustrates at least one additional alternative configuration disclosed herein according to a method of transferring cargo containers to and from a multiple-container storage structure of FIGS. 9-13;

DETAILED DESCRIPTION

The following detailed description is directed to systems and methods of loading and unloading cargo containers with respect to a multiple-container storage structure.

The operating procedure for the configurations described herein is based primarily upon the equipment noted below. One feature of the operating procedure is that the system permits the staging of cargo in advance of the arrival of the primary transport vehicle (e.g., vessel, airplane, etc.). This eliminates or reduces the expenditure of staging time while the primary transport vehicle is present. Furthermore, staging is possible without occupying a cargo loader vehicle that moves containers from a staging area to the primary transport vehicle. This enables the cargo loader vehicle to avoid waiting for staging, thereby increasing its utilization.

The staging process is divided into two stages described below in the departure mode, (the arrival mode being essentially the same in reverse), where containers are first staged in ground-based stacks. The containers are then staged on a cargo transfer pallet on a cargo staging structure shortly before the primary transport vehicle is to be loaded.

Another feature of the operating procedure is that the system is reversible. In most operations, the primary transport vehicle arrives with a load of containers and departs with a different load of containers. The primary transport vehicle envisioned for this system has a number of cargo bays, (e.g., in FIGS. 9-20, three cargo bays are disposed on an upper deck, and three are disposed on a lower deck).

Once the contents of a first cargo bay is removed from the primary transport vehicle, it is possible to insert a number of contiguous containers into the primary transport vehicle in the newly emptied cargo bay and remove another set of contiguous containers from a different cargo bay within the primary transport vehicle in a single round trip between the cargo staging structure and the primary transport vehicle.

Figure 1:
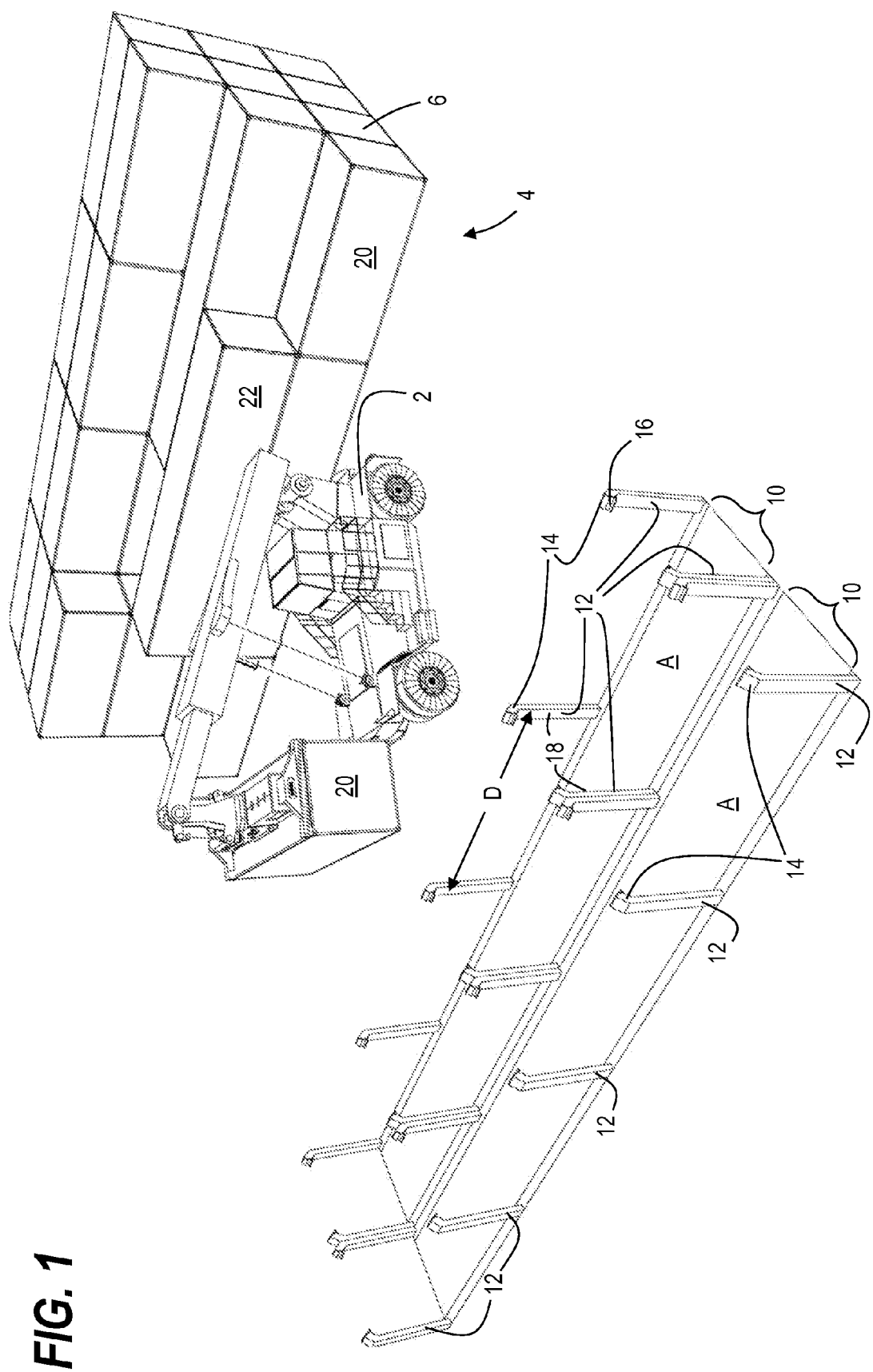
FIG. 1 illustrates at least one configuration disclosed herein including a cargo transfer system illustrating a loading yard area including multiple cargo staging structures and a plurality of containers ready to be loaded with the cargo transfer system.

FIG. 1 illustrates at least one configuration disclosed herein including a cargo transfer system illustrating a loading yard area including multiple cargo staging structures 10 and a plurality of containers 20, 22 in a cargo staging area 4 creating a storage stack 6 ready to be loaded with the cargo transfer system. A reach stacker 2 is utilized to move, for example, 20-foot containers 20 and 40-foot containers 22 from the cargo staging area 4 onto the cargo staging structures 10 further described below.

FIG. 1 illustrates two parallel cargo staging structures 10 that are defined by a cargo loader vehicle area A. Opposing support members 12 are arranged along either side of the cargo loader vehicle area A having upper ends 14 of the opposing support members including L-shaped registration members 16 for locating a cargo transfer pallet 30, (illustrated below), for supporting containers 20, 22 thereon. The opposing support members 12 are arranged in pairs 18 across the cargo loader vehicle area A and may be separated by a distance D approximately equal to a unit length of a cargo container 20, in this instance, approximately equal to a 20-foot container length represented by reference number 20.

In general, a storage phase occurs in the departure and arrival modes presented herein. A "departure" storage mode refers to containers arriving at the point of departure for primary transport vehicle by surface transport "departing" on the primary transport vehicle. An "arrival" storage mode refers to containers arriving by the primary transport vehicle and departing by surface transport. Note that it is possible to arrive and depart by air in cargo aircraft. In this case the arrival mode will precede the departure mode.

In departure storage mode, containers 20, 22 arrive by surface mode, (truck or train for example), and containers 20, 22 are removed from the surface transport by a reach stacker 2 and placed in the storage stack 4. Orienting the containers' doors to the rear of the primary transport vehicle is a consideration in this operation. The containers are placed in the cargo staging area 4 in the storage stack 6 that facilitate later transfer to a cargo staging structure 10 in the correct, desired order.

In arrival storage mode, containers 20, 22 are taken from the cargo staging structure 10 and are placed on the storage stack 6 by the reach stacker 2. The reach-stacker 2 is a typical piece of cargo handling equipment used at cargo loading areas and may optionally be substituted with a self-propelled crane with vertical and longitudinal lift capability or any other suitable device or mechanism. Again, this arrival storage mode may be performed in a particular order to permit later orderly transfer to surface transport without first moving other containers out of the way.

Figure 2B:
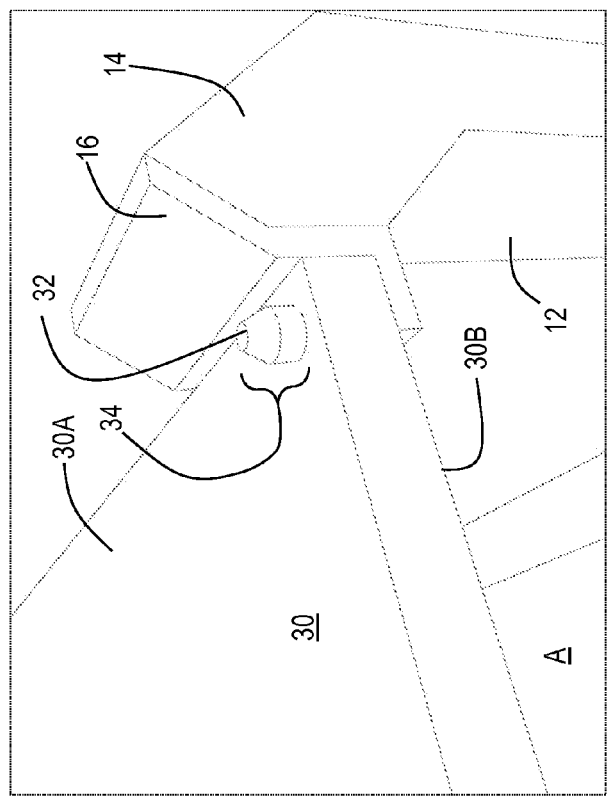
FIGS. 2A-2B illustrate the at least one configuration disclosed herein according to the cargo transfer system of FIG. 1 illustrating a single cargo staging structure in FIG. 2A.
Figure 2A:
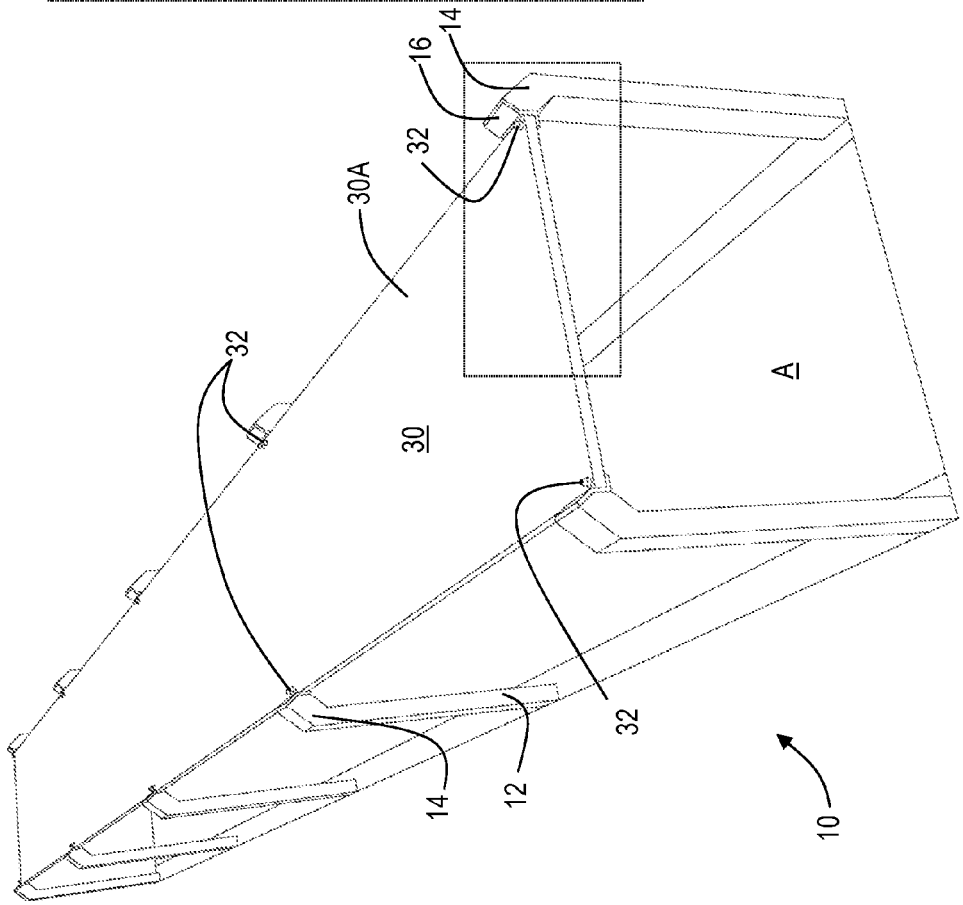

FIGS. 2A-2B illustrate the at least one configuration disclosed herein according to the cargo transfer system of FIG. 1 illustrating a single cargo staging structure 10 and a cargo transfer pallet 30 in FIG. 2A, and a blow-up view of a corner of a cargo transfer pallet 30 registered on an upper end 14 of one opposing support member 12 of the cargo staging structure 10 in FIG. 2B. The cargo transfer pallet 30, supported upon the L-shaped registration members 16, supports and registers the ISO containers 20, 22 on registration pins 32 thereon and is disposed between the ISO containers and the cargo loader vehicle 50 (see FIG. 4) positioned thereunder in the cargo loader vehicle area A.

FIGS. 2A-2B illustrate registration pin 32 positioned on an upper surface 30A of the cargo transfer pallet 30 and oriented proximate the peripheral edges to receive the corner fittings 24 on the underside 26 (both shown in FIG. 3) of the containers 20, 22 to prevent any lateral displacement of the containers 20, 22 when registered on the cargo transfer pallet 30. The registration pins 32 are positioned to accept 20-foot 20 and 40-foot containers 22. This allows, for example, 20-ft containers 20 to fit in either a 1st, 2nd, 3rd or 4th respective position on the cargo transfer pallet 30, and 40-ft containers to fit in a 1st and 2nd, a 2nd and 3rd, or a 3rd and 4th position, respectively.

Figure 12A:
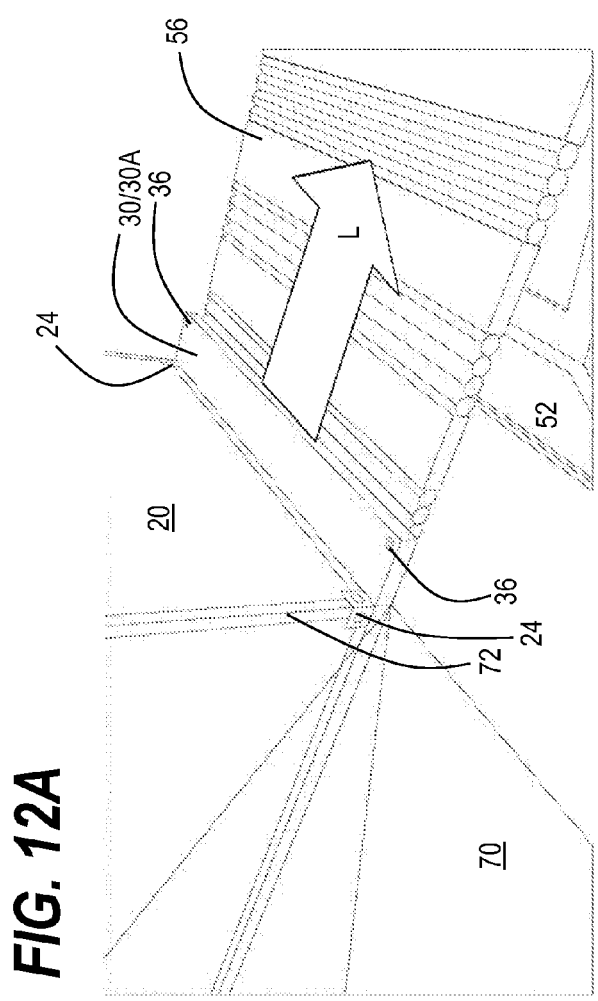
FIGS. 12A-12B illustrate at least one configuration disclosed herein according to a method of transferring cargo containers to and from a multiple-container storage structure of FIGS. 9-11.
Figure 12B:
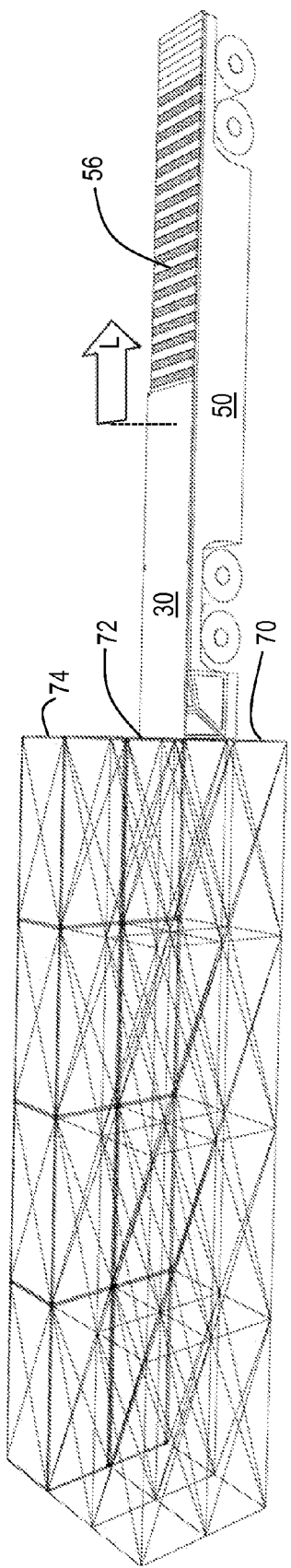
Figure 13:
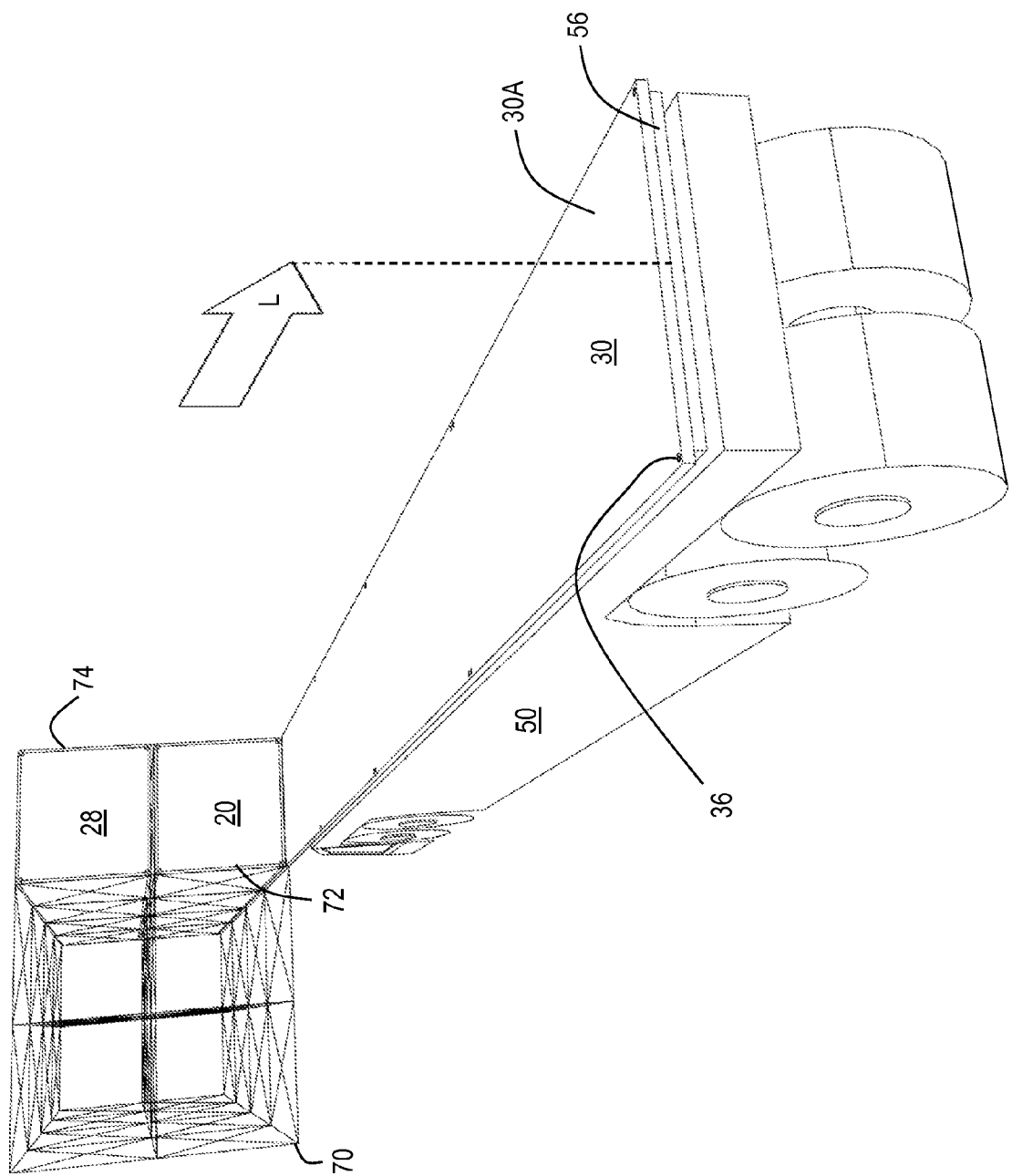
FIG. 13 illustrates at least one configuration disclosed herein according to a method of transferring cargo containers to and from a multiple-container storage structure of FIGS. 9-12B.

FIGS. 2A-2B additionally illustrate one configuration of the cargo transfer pallet 30 where the registration pins 32 are able to move between a projected position 34 and a retracted position 36 as illustrated in FIGS. 12A-13, below.

Figure 3:
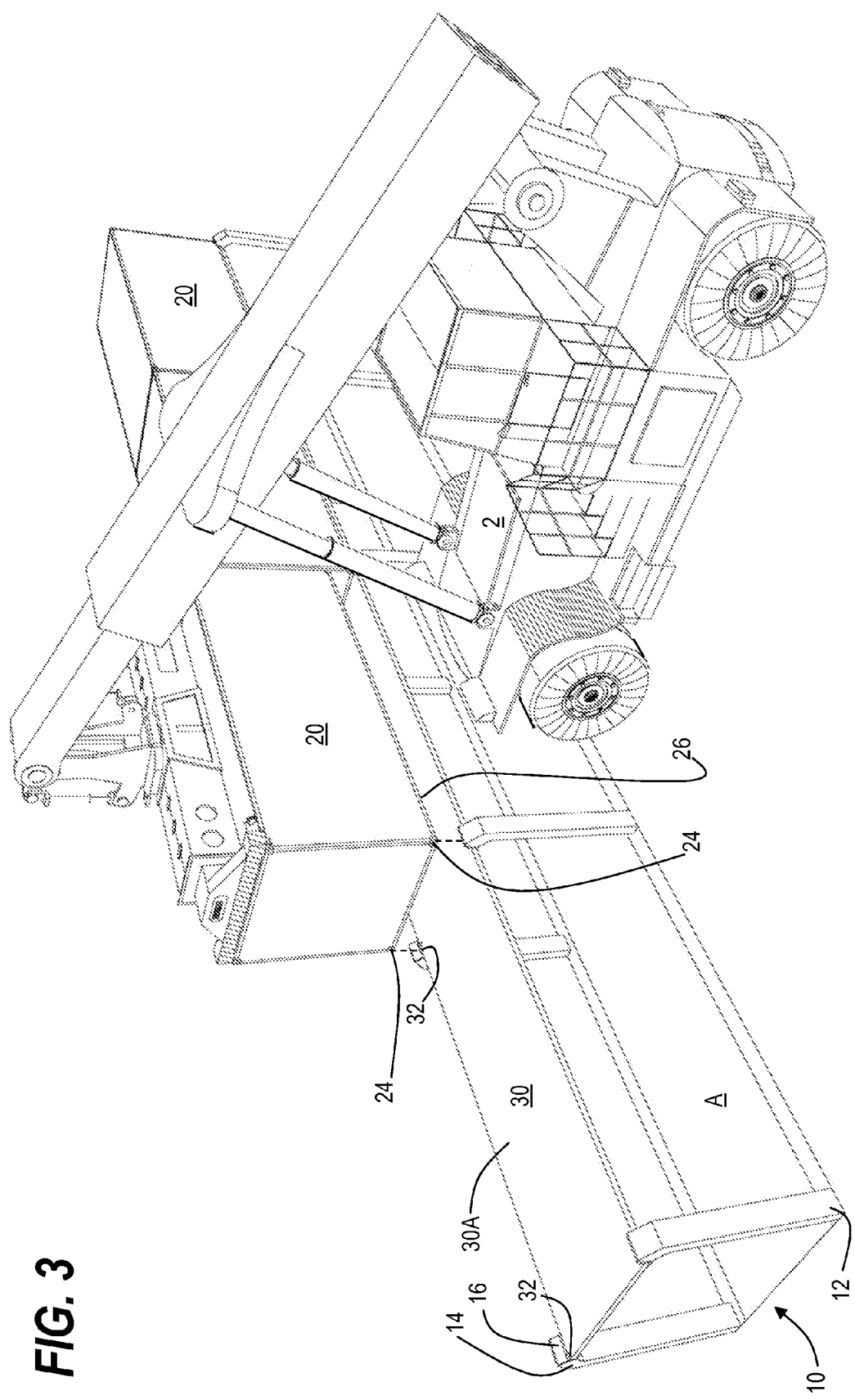
FIG. 3 illustrates the at least one configuration disclosed herein according to the cargo transfer system of FIGS. 1-2B.

FIG. 3 illustrates the at least one configuration disclosed herein according to the cargo transfer system of FIGS. 1-2B illustrating the single cargo staging structure 10 having the cargo transfer pallet 30 and containers 20 loaded and being loaded thereon by the reach stacker 2 to secure the containers 20 upon corresponding registration pins 32 of the cargo transfer pallet 30. FIG. 3 illustrates a staging phase where containers 20, 22 are transferred from the storage stack 6 to the cargo transfer pallet 30 on the cargo staging structure 10.

Staging is preferably done before the primary transport vehicle arrives. The containers 20, 22 may be placed in a particular order on a particular cargo transfer pallet 30, intended for a particular position within the primary transport vehicle. This permits precise control of the primary transport vehicle's loaded center of gravity and may facilitate cargo handling at the destination. However, in some circumstances it may be possible to transfer loads directly from surface transportation vehicles to the cargo transfer pallet 30. This can reduce the time that the container is not in motion, thereby speeding its transport.

FIG. 4 illustrates at least one configuration disclosed herein according to the cargo transfer system of FIGS. 1-3 illustrating a cargo loader vehicle 50 being positioned under a portion of the cargo staging structure 10 within the cargo loading area A that supports a fully loaded cargo transfer pallet 30 and corresponding containers 20 loaded thereon. The cargo loader vehicle 50 includes a forward facing cab 52 for an operator and multiple wheel assemblies 54 for controlling the direction of the cargo loader vehicle 50 during all phases of loading and unloading. A powered translation support bed 56 is located on an upper portion of the cargo loader vehicle 50 having a plurality of translation rollers 58 or other equivalent mechanisms capable of moving the cargo transfer pallet 30 and any corresponding containers 20 thereon in a forward and aft direction with respect to the centerline of cargo loader vehicle 50

The disposition of the opposing support members 12 of the cargo staging structure 10 permits the cargo loader vehicle 50 to drive underneath a cargo transfer pallet 30 supported on the opposing support members 12, (and any containers 20, 22 thereon), and engage a bottom surface 30B of the cargo transfer pallet 30 to carry it away from the cargo staging structure 10. Therefore, a portion of the cargo staging structure 10 may be elevated above a surface where a cargo loader vehicle 50 operates (as shown in FIGS. 1-8), or supported on a surface where a cargo loader vehicle 50 operates underneath the cargo staging structure, (not shown).

The cargo loader vehicle 50 described herein is similar in concept to existing military cargo loader vehicles commonly called "K-loaders." The cargo loader vehicle 50 in the configurations presented herein is different in that it has a greater weight capacity and in that it need not lower the bed to as low a position as existing K-loader vehicles. Also, the cargo loader vehicle 50 described herein may be considerably longer than existing cargo loader vehicles (for example, 80 feet versus approximately 49 feet). Note that the length of the cargo transfer pallet 30 and the cargo loader vehicle 50 can be longer or shorter than 80 feet. The cargo loader vehicle 50 has a powered mechanism, for example, a powered translation support bed 56 that moves the cargo transfer pallet 30 in a linear direction L into and out of the primary transport vehicle as shown below.

The cargo loader vehicle bed may include a guide mechanism for the cargo transfer pallet 30 so that it cannot move laterally with respect to the cargo loader vehicle 50, and a cab for an operator that is positioned underneath the powered translation support bed 56 even when it is fully lowered. The cab may be disposed at both ends so that the operator may drive in a forward position, even if the vehicle is backing up with respect to loading or unloading cargo containers. Additionally, the wheel assemblies 54 are steerable to allow cargo loader vehicle 50 to maneuver and typical steering coordinates wheels to provide a common center point. Steering may additionally provide independent wheel steering to permit "sideslip" and combination sideslip and turn maneuvers.

The cargo loader vehicle 50 may additionally include a mechanism to guide the driver in the cab or to automatically align cargo loader vehicle 50 with cargo staging structure 10, and to align the cargo loader vehicle 50 with the primary transport vehicle storage openings. There may also be mechanisms to assist in alignment, or automatically align, the cargo loader vehicle 50 with the cargo staging structure 10. This may be a narrow, long slot that may assist in directing the cargo loader vehicle 50 traveling within the cargo staging structure 10 to avoid collisions and increase the precision of centering the cargo loader vehicle 50 under the cargo transfer pallet 30.

FIG. 5 illustrates the at least one configuration disclosed herein according to the cargo transfer system of FIGS. 1-4 illustrating the cargo loader vehicle 50 of FIG. 4 positioned under the cargo staging structure 10 within the cargo loading vehicle area A supporting the loaded cargo transfer pallet 30 and corresponding containers 20 loaded thereon. FIG. 5 further illustrates the powered translation support bed 56 being immediately under an underside 30B of the cargo transfer pallet 30 and separated by a gap G before the powered translation support bed 56 is raised in a vertical direction to contact and elevate the cargo transfer pallet 30 above the L-shaped registration members 16 of the opposing support members 12.

Figure 6B:
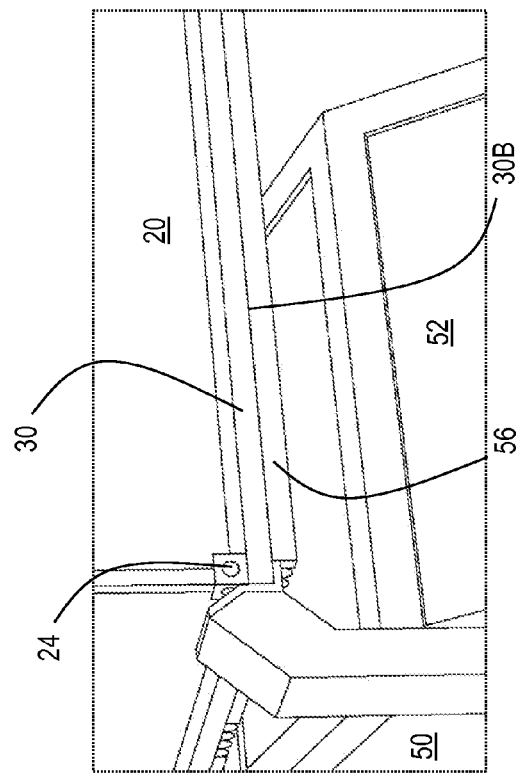
FIGS. 6A-6B illustrate the at least one configuration disclosed herein according to the cargo transfer system of FIGS. 1-5.
Figure 6A:
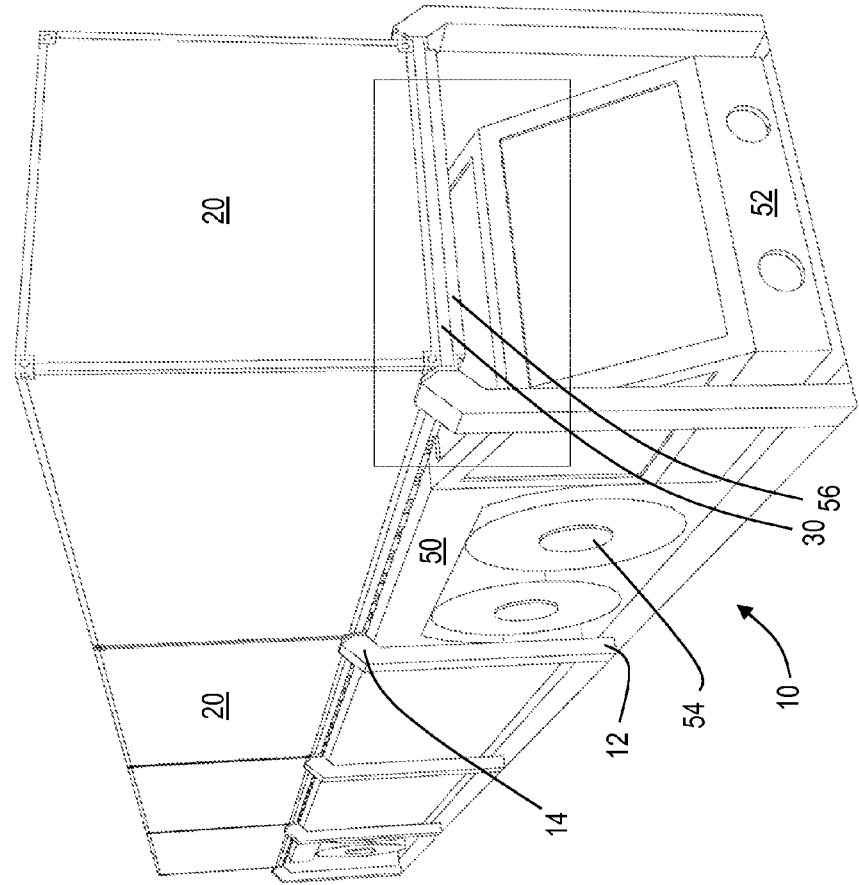

FIGS. 6A-6B illustrate the at least one configuration disclosed herein according to the cargo transfer system of FIGS. 1-5 illustrating the cargo loader vehicle 50 of FIGS. 4-5 positioned under the cargo staging structure 10 within the cargo loader vehicle area A with the loaded cargo transfer pallet 30 and corresponding containers 20 loaded thereon, where the powered translation support bed 56 is vertically raised into engagement with the underside 30B of the cargo transfer pallet 30 supporting the containers 20 on the cargo staging structure 10. The cargo loader vehicle 50 raises the powered translation support bed 56 to elevate the cargo transfer pallet 30 above and off the cargo staging structure 10.

Figure 7:
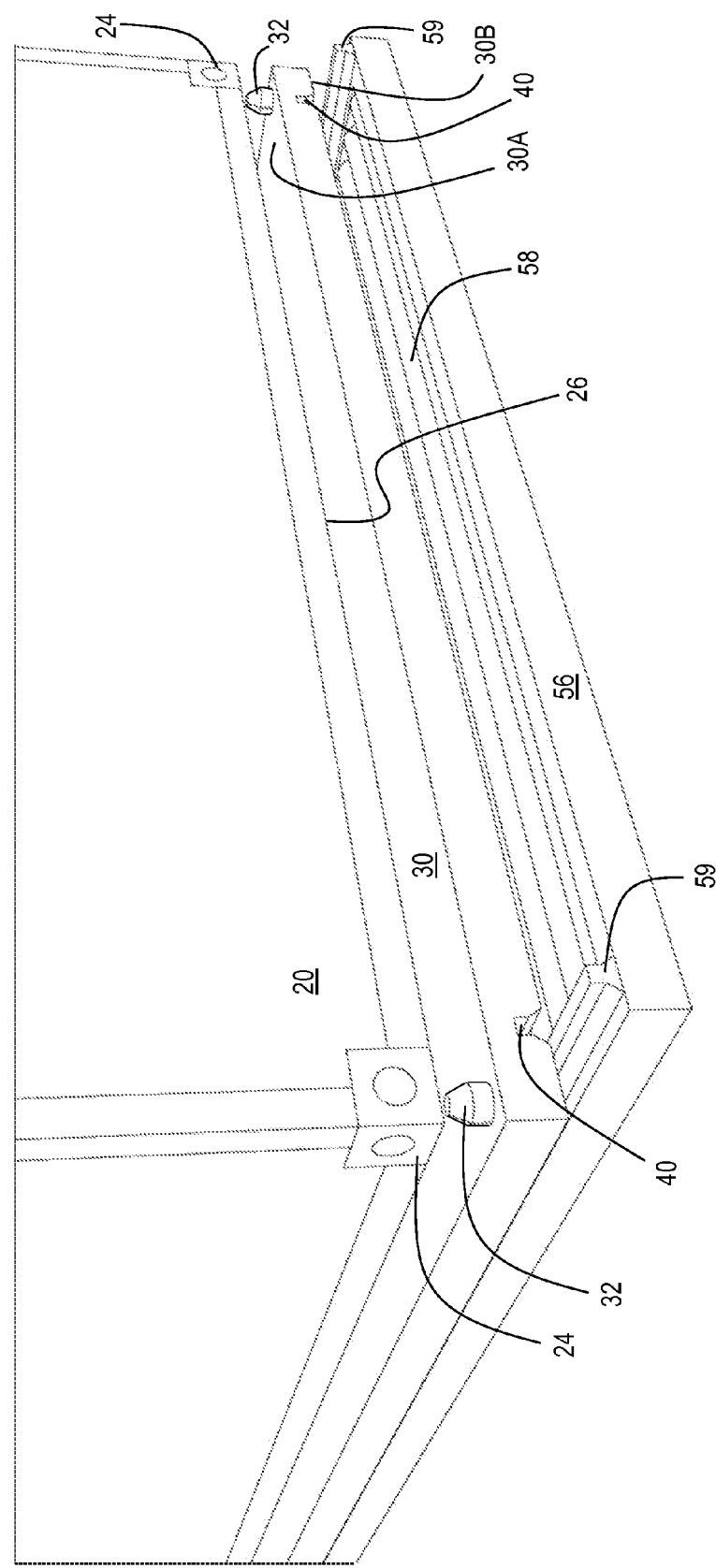
FIG. 7 illustrates at least one further configuration disclosed herein of a translation alignment device that may be applied to the cargo transfer pallet and the powered translation support bed as shown in FIGS. 2A-6B and the remaining figures.

FIG. 7 illustrates at least one further configuration disclosed herein of a translation alignment device that may be applied to the cargo transfer pallet 30 and the powered translation support bed 56 as shown in FIGS. 2A-6B and the remaining figures. Features of the powered translation support bed also restrict the motion of the cargo transfer pallet 30 to only a forward and aft direction. FIG. 7 illustrates one representative configuration where a pallet translation alignment device 40, for example, a groove, is disposed on opposing sides of the cargo transfer pallet 30. The powered translation support bed 56 includes a corresponding device 59, for example, a rail, designed to be received within the structure of the pallet translation alignment device 40 of the cargo transfer pallet 30. In the alternative, the groove/rail configuration may be reversed such that the powered translation support bed 56 may include a groove and the cargo transfer pallet 30 may include a corresponding rail to be received within the groove. Other equivalent mechanisms that limit the motion of the cargo transfer pallet 30 on the powered translation support bed 56 to a forward and aft direction may be implemented at the interface of the top portion of the powered translation support bed 56 and the underside 30B of the cargo transfer pallet 30 to achieve alignment of the cargo containers 20 on the cargo loader vehicle 50.

Figure 8:
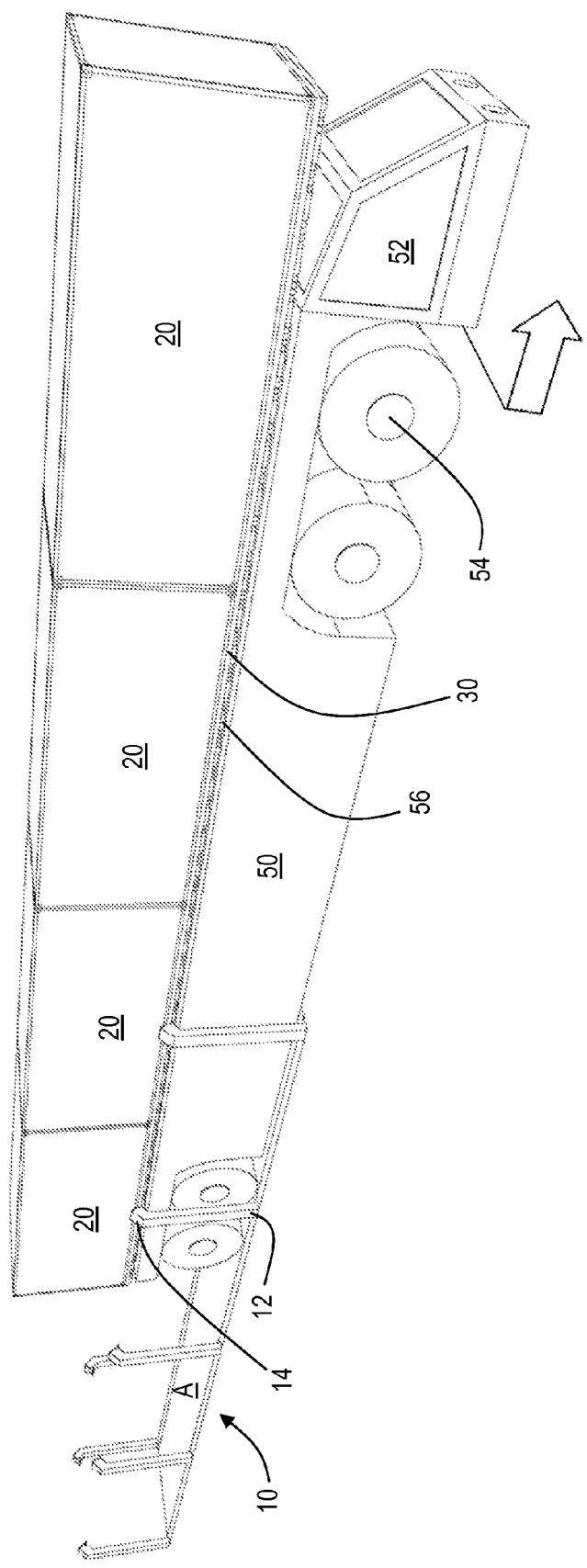
FIG. 8 illustrates the at least one configuration disclosed herein according to the cargo transfer system of FIGS. 1-7.

FIG. 8 illustrates the at least one configuration disclosed herein according to the cargo transfer system of FIGS. 1-7 illustrating the cargo loader vehicle 50 of FIGS. 4-6B being removed from the cargo loader vehicle area A of the cargo staging structure 10 having the loaded cargo transfer pallet 30 and corresponding containers 20 loaded thereon.

Figure 9:
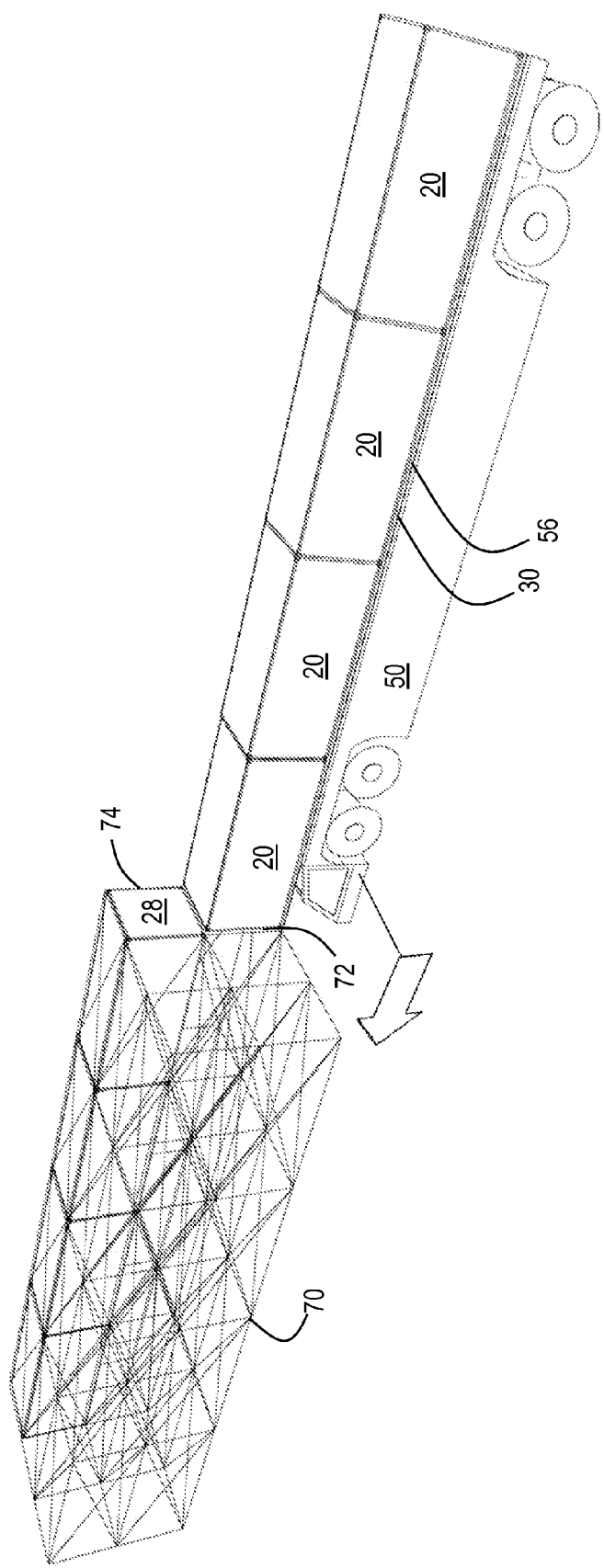
FIG. 9 illustrates at least one configuration disclosed herein according to a method of transferring cargo containers to and from a multiple-container storage structure, the at least one configuration illustrating the cargo loader vehicle positioned in front of a first cargo container storage opening in preparation of loading a set of containers into the multiple-container storage structure.

FIG. 9 illustrates at least one configuration disclosed herein according to a method of transferring cargo containers 20 to and from a multiple-container storage structure 70, that illustrates the cargo loader vehicle 50 positioned in front of a first cargo container storage opening 72 in preparation to load a set of containers 20 on a cargo transfer pallet 30 into the multiple-container storage structure 70. At this phase of loading, either the powered translation support bed 56 needs to be raised to a height to accommodate a target opening in the multiple-container storage structure 70, or the multiple-container storage structure 70 is positioned to accommodate the lowest position of the containers 20 supported on the cargo transfer pallet 30 on the powered translation support bed 56. For FIGS. 9-13, the latter of these two representative scenarios is illustrated. A second cargo container storage opening 74 is illustrated adjacent the first cargo container storage opening 72 along with a plurality of cargo container storage openings corresponding to the loading and unloading end of the multiple-container storage structure 70.

FIG. 10 illustrates at least one configuration disclosed herein according to a method of transferring cargo containers 20 to and from a multiple-container storage structure 70 of FIG. 9, the at least one configuration illustrating the cargo loader vehicle 50 moving a set of cargo containers 20 on the cargo transfer pallet 30 into the first cargo container storage opening 72 of the multiple-container storage structure 70. The powered translation support bed 56 translates the cargo transfer pallet 30 and any corresponding cargo containers 20 thereon by means of the translation rollers 58 or other similar mechanisms. The alignment system as illustrated in FIG. 7 causes both the cargo transfer pallet 30 and the cargo containers 20 supported thereon to move in a linear direction L into the first cargo container storage opening 72.

A corresponding translation mechanism (not shown) within the multiple-container storage structure 70 may assist the cargo transfer pallet 30 being received within the multiple-container storage structure 70.

FIG. 11 illustrates at least one configuration disclosed herein according to a method of transferring cargo containers 20 to and from a multiple-container storage structure 70 of FIGS. 9-10, the at least one configuration illustrating the cargo loader vehicle 50 having moved a complete set of cargo containers 20 on the cargo transfer pallet 30 into the first cargo container storage opening 72 of the multiple-container storage structure 70. At this point in the cargo loading phase, the multiple-container storage structure 70 activates a storage structure retention system (not shown) to, for example, engage corner fittings of the cargo containers 20 recently received within the first cargo container storage opening 72 to secure each container 20 within the multiple-container storage structure 70. In one configuration, the multiple-container storage structure 70 may engage restraining pins into the sides of the container 20 corner fittings 24 while leaving the cargo transfer pallet 30 registration pins 32 engaged in the corner fittings 24 from below. Once the multiple-container storage structure 70 engages the container 20, the cargo transfer pallet 30 may disengage the registration pins 32 through various mechanisms presented herein and the cargo transfer pallet 30 may be released from the container 20 corner fittings 24 in preparation for extraction from the multiple-container storage structure 70 described below.

FIGS. 12A-12B illustrate at least one configuration disclosed herein according to a method of transferring cargo containers to and from a multiple-container storage structure 70 of FIGS. 9-11, the at least one configuration illustrating the cargo transfer pallet 30 being removed from the first cargo container storage opening 72 of the multiple-container storage structure 70 in a linear direction L to be positioned back on the powered translation support bed 56 of the cargo loader vehicle 50. In this configuration, the cargo transfer pallet 30 may retract the registration pins 32 below the upper surface 30A of the cargo transfer pallet 30 into a retracted position 36 such that the cargo transfer pallet 30 may be disengaged from the corner fittings 24 of all the cargo containers 20 now being secured within the multiple-container storage structure 70 by means of the storage structure retention system.

FIG. 12A illustrates the cargo transfer pallet 30 being fed onto the upper surface of the powered translation support bed 56 by means of the powered translation storage structure mechanism (not shown) within the multiple-container storage structure 70. FIG. 12B illustrates the cargo transfer pallet 30 being received on the powered translation support bed 56 and moving in a linear direction L towards the aft-end of the cargo loader vehicle 50. Although the cargo transfer pallet 30 is shown only partially withdrawn from the multiple-container storage structure 70, a portion of the cargo transfer pallet 30 still remains within the multiple-container storage structure 70 until the cargo transfer pallet 30 is fully extracted.

FIG. 13 illustrates at least one configuration disclosed herein according to a method of transferring cargo containers 20 to and from the multiple-container storage structure 70 of FIGS. 9-12B, the at least one configuration illustrating the cargo transfer pallet 30 being fully removed from the first cargo container storage opening 72 of the multiple-container storage structure 70 and positioned on the powered translation support bed 56 of the cargo loader vehicle 50. Note that the registration pins 32 are still in their retracted position 36 beneath the upper surface 30A of the cargo transfer pallet 30 for the purpose of unloading a new set of containers 28 from a second cargo container storage opening 74 in the multiple-container storage structure 70 as illustrated in FIGS. 15-20 and described below.

FIGS. 14A-14B illustrate at least one alternative configuration disclosed herein according to a method of transferring cargo containers to and from a multiple-container storage structure 70 of FIGS. 9-13, in a similar manner to the configuration described in FIGS. 2A-2B and 12A-12B. In this representative alternative configuration, the cargo transfer pallet 30 includes a pallet elevation mechanism 42 capable of raising containers 20 above the registration pins 32 of the cargo transfer pallet 30. The pallet elevation mechanism 42 includes a portion immediately surrounding the registration pins 32 capable of engaging the underside of the cargo containers 20, preferably at the corner fittings 24, to raise the corner fittings 24 out of engagement and over the top portions 38 of the registration pins 32. This configuration accomplishes the same function as the retractable registration pins 32 as presented earlier but allows for the cargo containers 20 to be raised within the multiple-container storage structure 70 immediately before being secured by the storage structure retention system.

FIG. 15 illustrates an alternative configuration similar to the configuration disclosed in FIGS. 14A-14B according to a method of transferring cargo containers to and from a multiple-container storage structure 70 of FIGS. 9-13. In this configuration, a vertically translating pad 1510 or block located at corner and mid-pallet positions of the cargo transfer pallet 30, as illustrated above, includes a registration pin 32 affixed to a top surface 1510A of the vertically translating pad 1510. A first position 1500 provides for the vertically translating pad 1510 to have its top surface 1510A elevated above the top surface 30A of the cargo transfer pallet 30 to enable the top surface 1510A of the vertically translating pad 1510 to support the corner fittings 24 of the cargo containers 20. A second position 1502 provides for a neutral position where the vertically translating pad 1510 is lowered into the cargo transfer pallet 30 such that the top surface 1510A of the vertically translating pad 1510 is flush with the top surface 30A of the cargo transfer pallet 30, and the registration pin 32 is above the top surface 30A of the cargo transfer pallet 30. A third position 1504 provides for a lowered position where the vertically translating pad 1510 is fully lowered into the cargo transfer pallet 30 such that the top portion 38 of the registration pin 32 is below or even with the top surface 30A of the cargo transfer pallet 30. This fully lowered third position 1504 allows for the cargo transfer pallet 30 to be inserted and removed from the multiple-container storage structure 70 when it is desired to not interfere with containers 20 being retained within the multiple-container storage structure 70.

Figure 16:
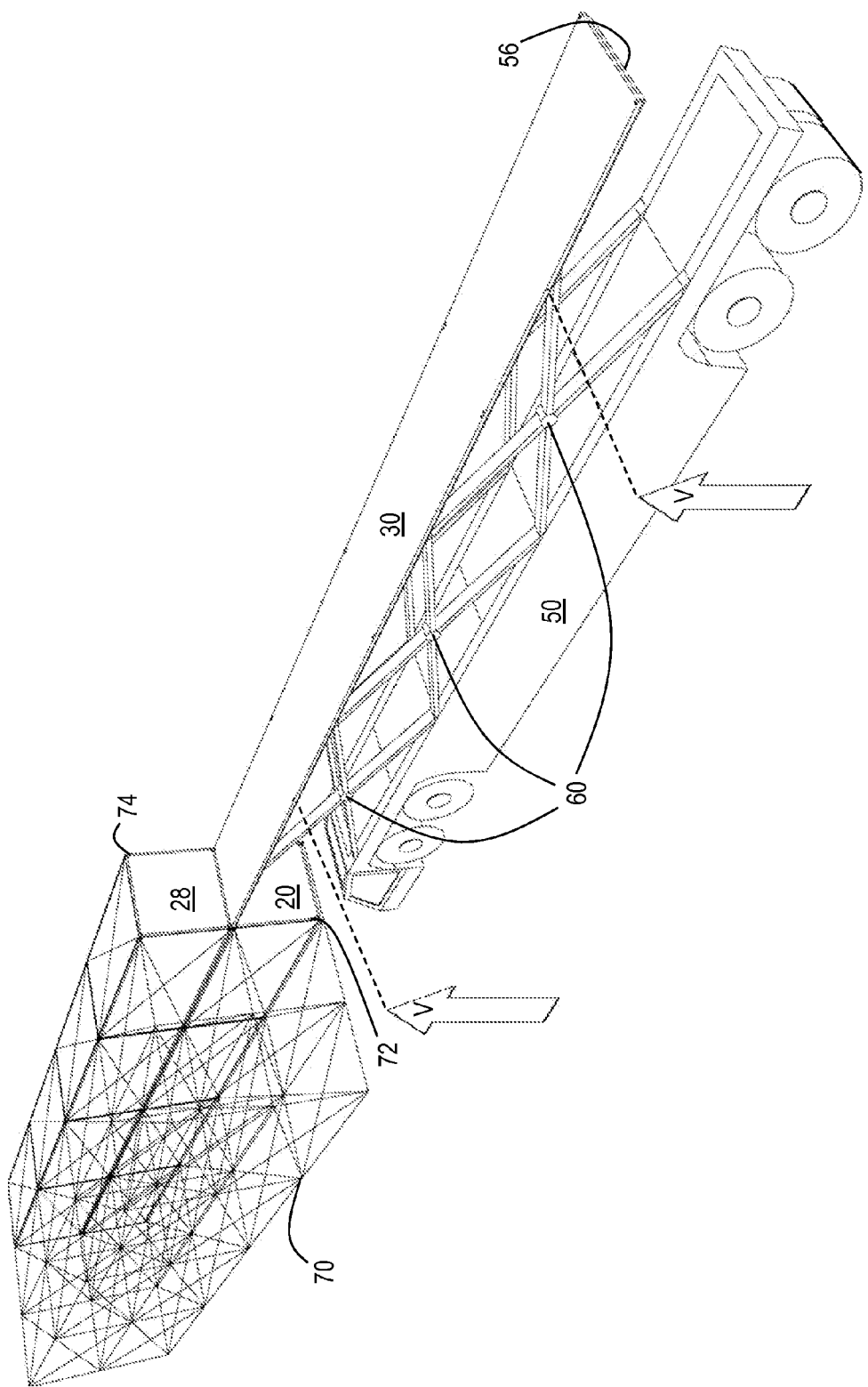
FIG. 16 illustrates at least one configuration disclosed herein according to a method of transferring cargo containers to and from a multiple-container storage structure of FIGS. 9-12B.

Both the pallet elevation mechanism 42 as illustrated in FIGS. 14A-14B and the retractable registration pins 32, as illustrated in FIGS. 12A-13, may be powered by an electrical power source on the cargo transfer pallet 30. The cargo loader vehicle 50 may likewise provide a corresponding interface mechanism to recharge the electrical power source while being supported on the powered translation support bed 56. Alternatively, recharging may be provided by an interface on the cargo staging structure 10. FIG. 16 illustrates at least one configuration disclosed herein according to a method of transferring cargo containers 20 to and from a multiple-container storage structure 70 of FIGS. 9-12B, where the configuration illustrates an elevating mechanism 60 on the cargo loader vehicle 50 capable of moving the powered translation support bed 56 in an upward vertical direction V. Additional fine adjustments in other directions, for example, pitch and roll angle, may be desired to compensate for uneven cargo apron surfaces or for flexure in an airplane's landing gear, for instance. The vertical movement and these other desired adjustments align the powered translation support bed 56 with a second container storage opening 74 having another set of cargo containers 28 located therein.

Figure 17:
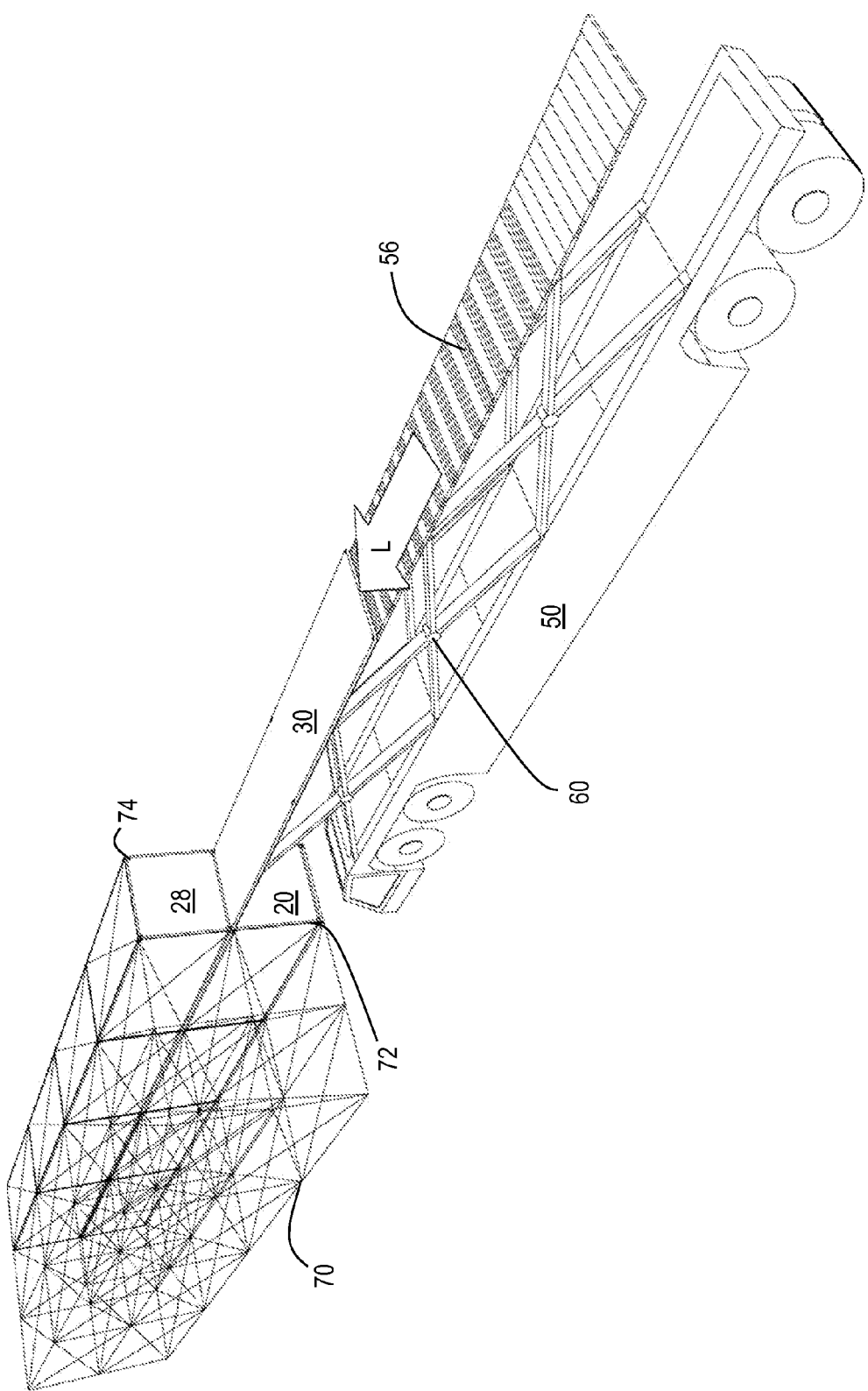
FIG. 17 illustrates at least one configuration disclosed herein according to a method of transferring cargo containers to and from a multiple-container storage structure of FIGS. 9-16.

FIG. 17 illustrates at least one configuration disclosed herein according to a method of transferring cargo containers 20, 28 to and from a multiple-container storage structure 70 of FIGS. 9-16, where the configuration illustrates the cargo transfer pallet 30 being partially inserted in a linear direction L into a second cargo container storage opening 74 of the multiple-container storage structure 70 in a similar manner to that illustrated in FIG. 10.

Figure 18:
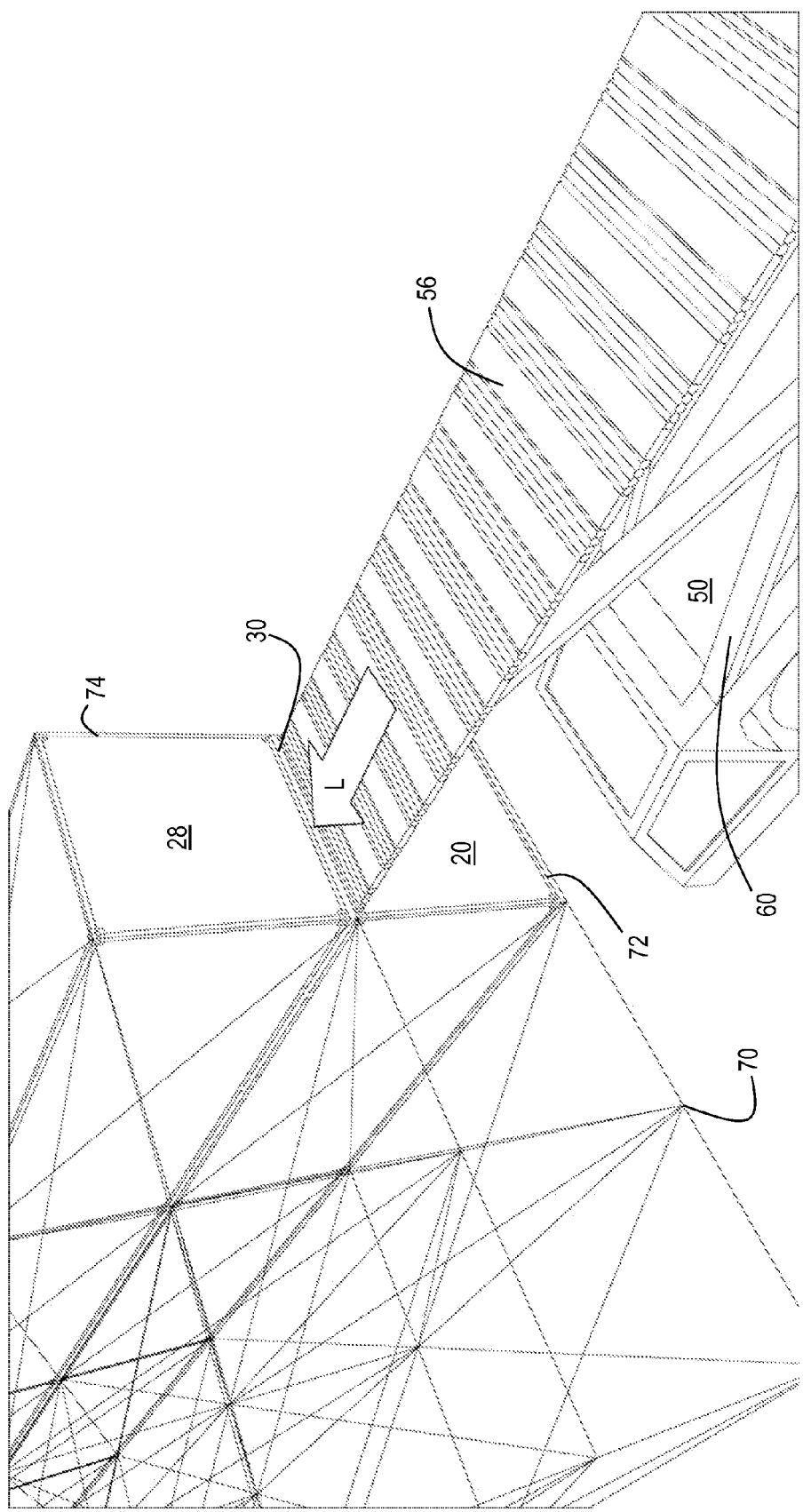
FIG. 18 illustrates at least one configuration disclosed herein according to a method of transferring cargo containers to and from a multiple-container storage structure of FIGS. 9-17.

FIG. 18 illustrates at least one configuration disclosed herein according to a method of transferring cargo containers 20, 28 to and from a multiple-container storage structure 70 of FIGS. 9-17, where the configuration illustrates the cargo transfer pallet 30 being fully inserted into the second cargo container storage opening 74 of the multiple-container storage structure 70 in a similar manner to that illustrated in FIG. 11.

Figure 19:
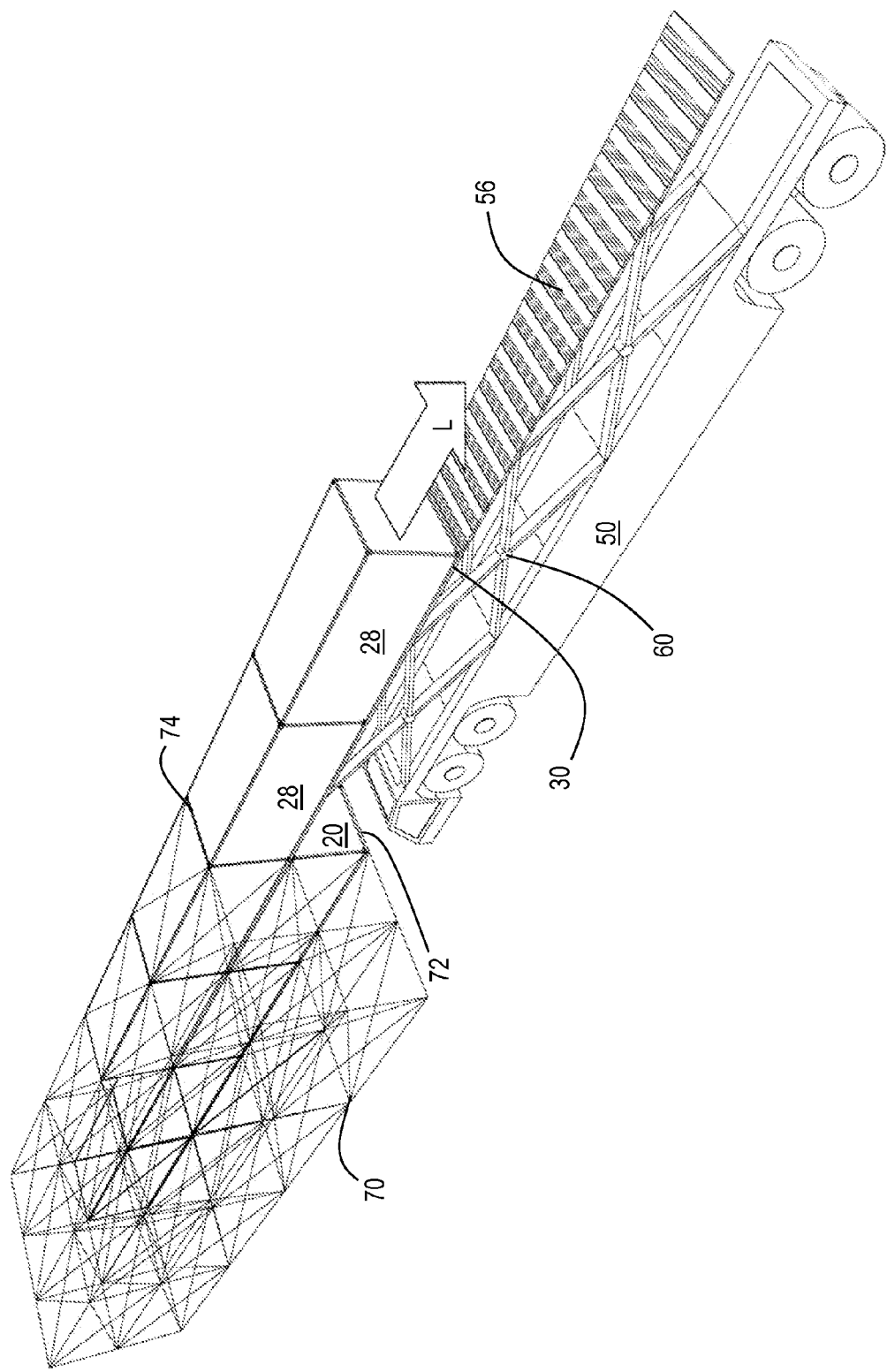
FIG. 19 illustrates at least one configuration disclosed herein according to a method of transferring cargo containers to and from a multiple-container storage structure of FIGS. 9-18.

FIG. 19 illustrates at least one configuration disclosed herein according to a method of transferring cargo containers 20, 28 to and from a multiple-container storage structure 70 of FIGS. 9-18, where the configuration illustrates the cargo transfer pallet 30 and supported cargo containers 28 being removed from the second cargo container storage opening 74 of the multiple-container storage structure 70 in a linear direction L to be positioned on the powered translation support bed 56 of the cargo loader vehicle 50.

Figure 20:
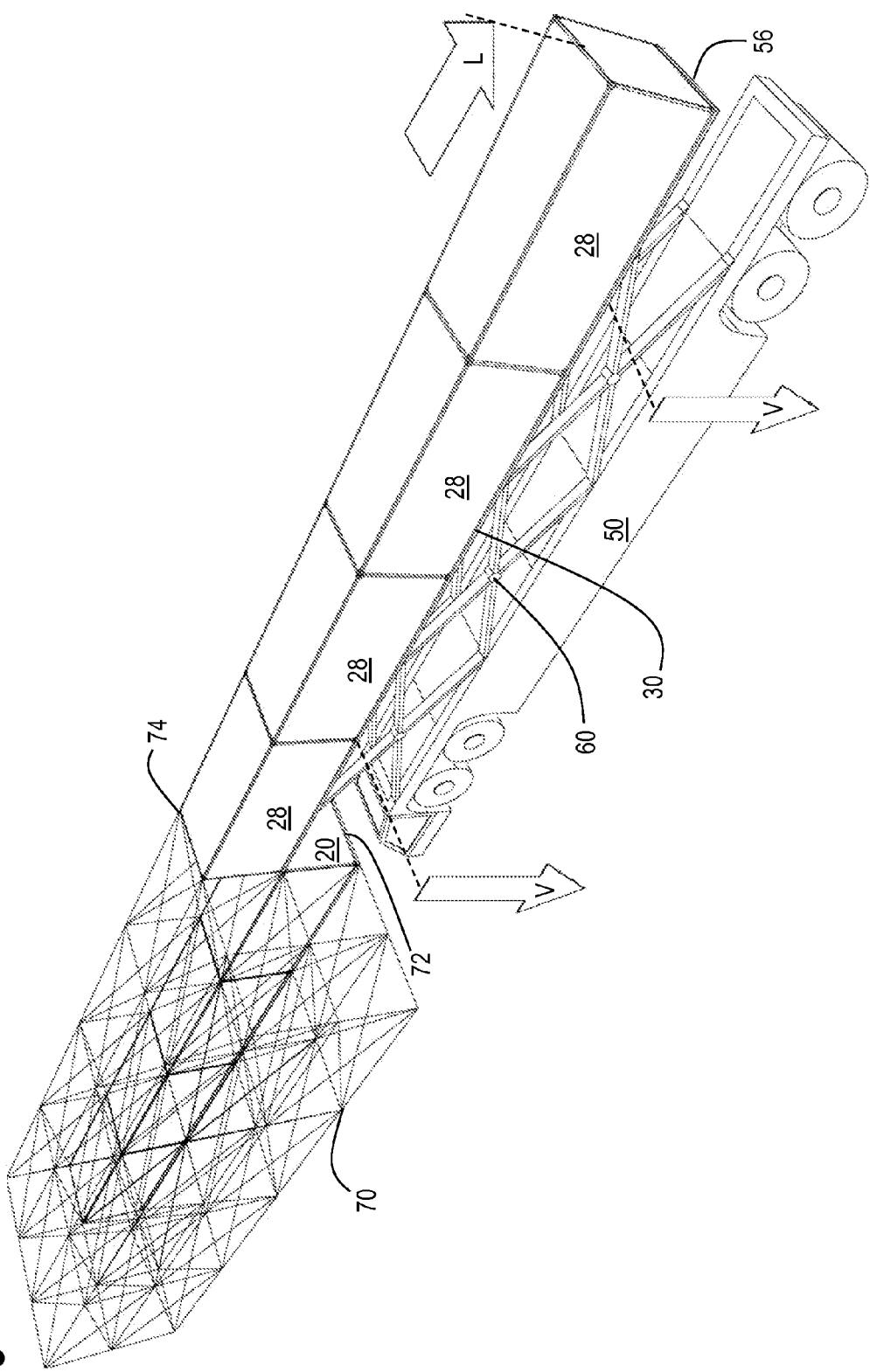
FIG. 20 illustrates at least one configuration disclosed herein according to a method of transferring cargo containers to and from a multiple-container storage structure of FIGS. 9-19.

FIG. 20 illustrates at least one configuration disclosed herein according to a method of transferring cargo containers 20, 28 to and from a multiple-container storage structure 70 of FIGS. 9-19, where the configuration illustrates the cargo transfer pallet 30 being fully removed from the second cargo container storage opening 74 of the multiple-container storage structure 70 and positioned on the powered translation support bed 56 of the cargo loader vehicle 50. The elevating mechanism 60 on the cargo loader vehicle 50 may then lower or further rise if desired, the powered translation support bed 56 in downward vertical direction V.

Figure 21:
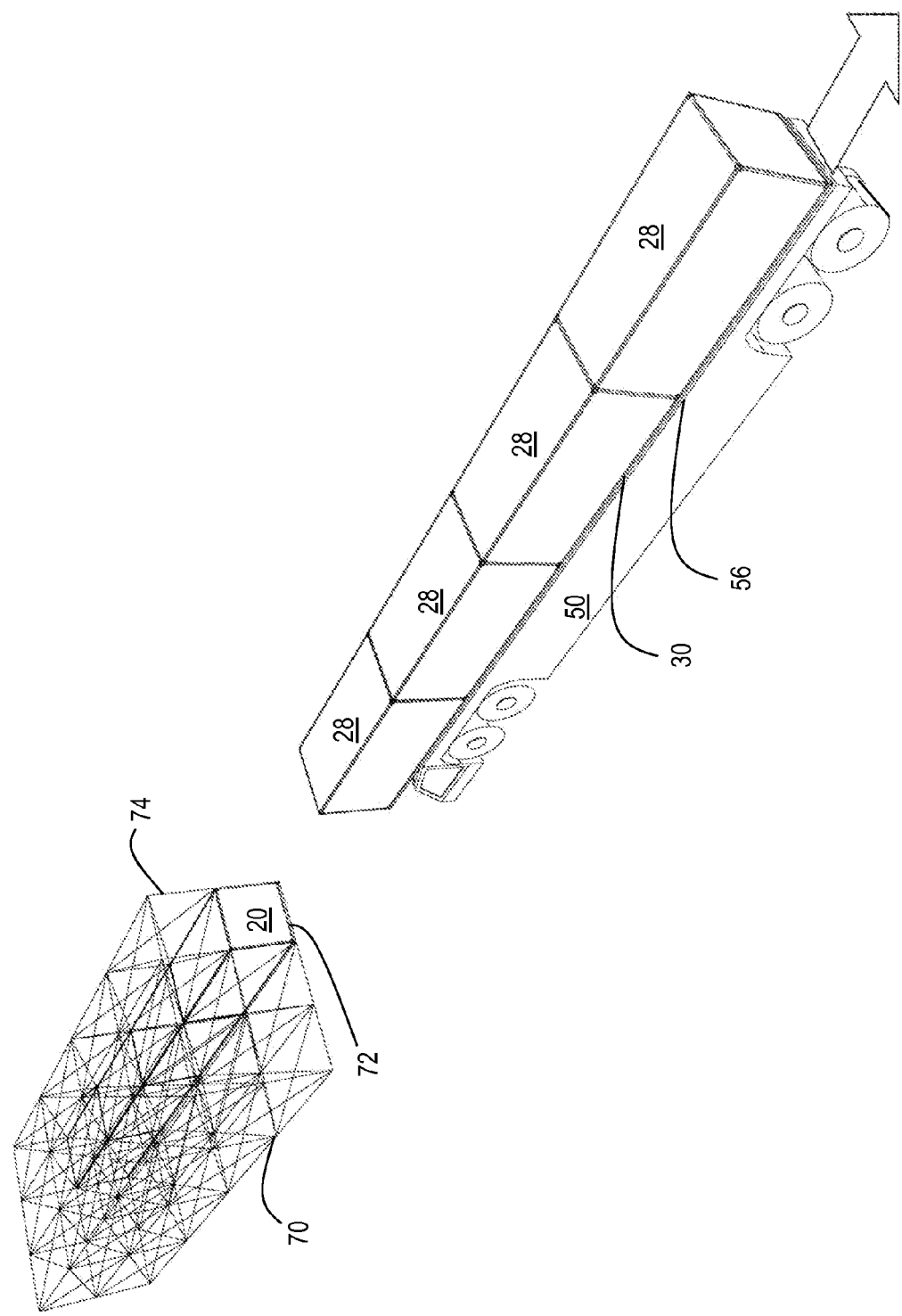
FIG. 21 illustrates at least one configuration disclosed herein according to a method of transferring cargo containers to and from a multiple-container storage structure of FIGS. 9-20.

FIG. 21 illustrates at least one configuration disclosed herein according to a method of transferring cargo containers 20, 28 to and from a multiple-container storage structure 70 of FIGS. 9-20, where the configuration illustrates the cargo loader vehicle 50 moving away with the cargo containers 28 from the second cargo container storage opening 74 removed from of the multiple-container storage structure 70. At this point, the cargo loader vehicle 50 may return to the cargo staging structure 10 as illustrated in FIGS. 1-8 to unload the cargo transfer pallet 30 and the supported cargo containers 28, and repeat the process of loading and unloading containers to and from the multiple-container storage structure 70 of FIGS. 9-19.

Figure 22:
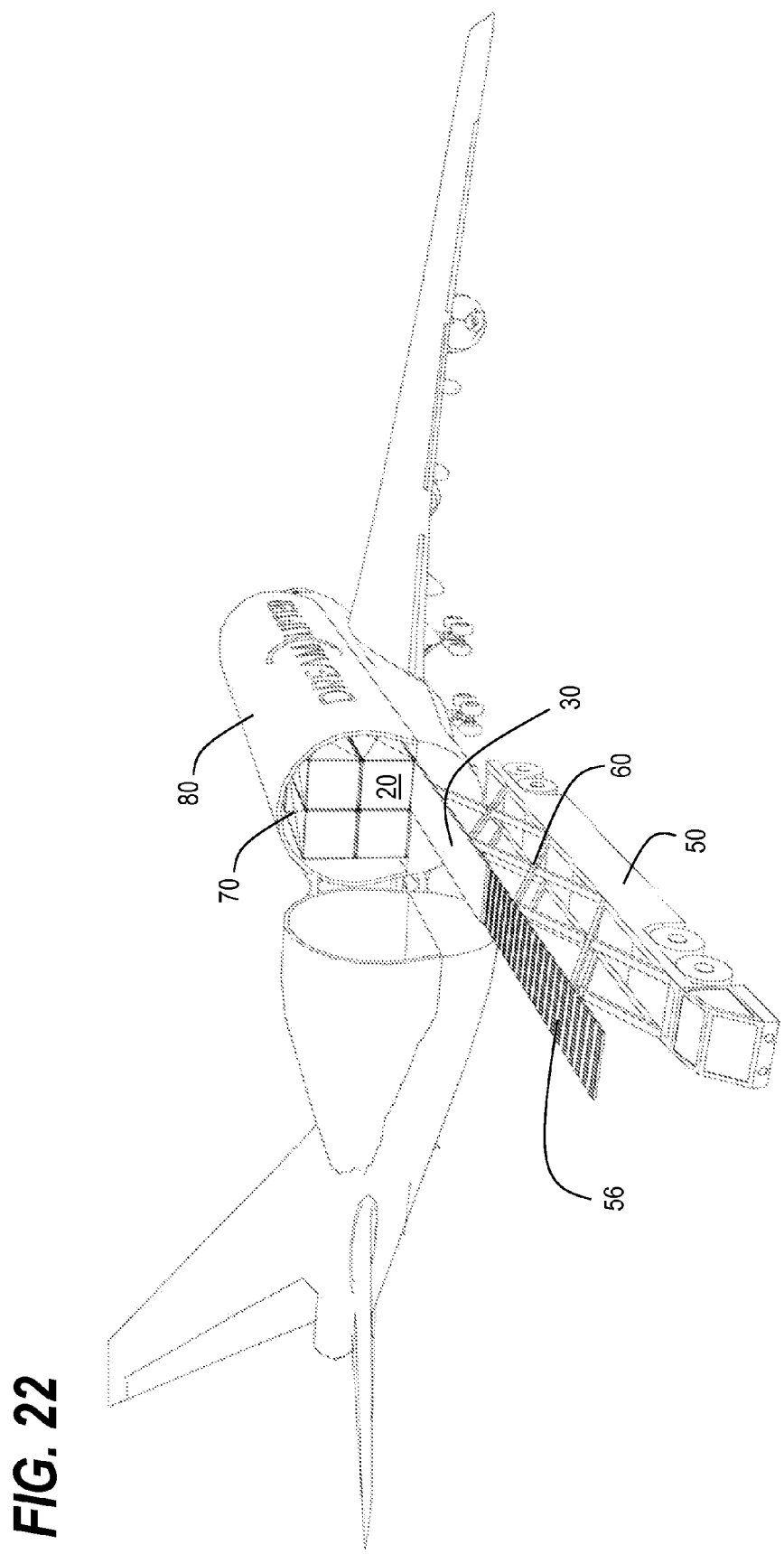
FIG. 22 illustrates at least one alternative configuration disclosed herein according to a method of transferring cargo containers to and from a multiple-container storage structure similar to those illustrated in FIGS. 9-13 and 15-21 being located within a cargo aircraft.
Figure 23:
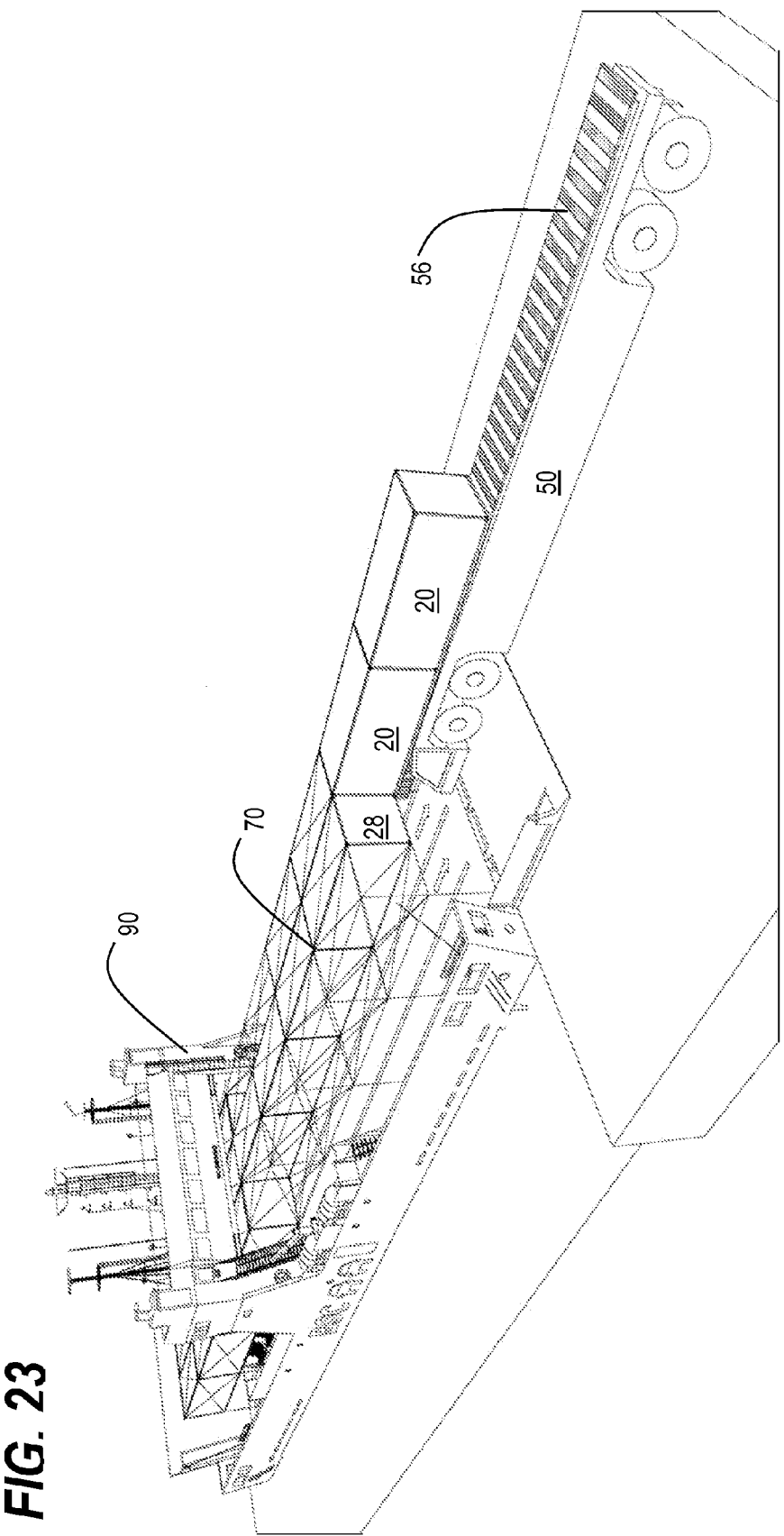
FIG. 23 illustrates at least one other alternative configuration disclosed herein according to a method of transferring cargo containers to and from a multiple-container storage structure similar to those illustrated in FIGS. 9-13 and 16-21 being located within a representative cargo ship or vessel.

FIG. 22 illustrates at least one alternative configuration disclosed herein according to a method of transferring cargo containers 20 to and from a multiple-container storage structure 70 similar to those illustrated in FIGS. 9-13 and 15-21 being located within a cargo aircraft 80. Similarly, FIG. 23 illustrates at least one other alternative configuration disclosed herein according to a method of transferring cargo containers 20 to and from a multiple-container storage structure 70 similar to those illustrated in FIGS. 9-13 and 15-21 being located within a representative cargo ship or vessel.

In summary, during the method of operation, the cargo transfer pallet 30 remains on the ground, that is, it is removed from the multiple-container storage structure 70 of a cargo vessel 90 before departure or a cargo aircraft 80 before flight.

Furthermore, the unloading phase is essentially the reverse of the loading phase. Note that it is possible, after loading a series of containers into the primary transport vehicles' storage structure, to withdraw another series of containers from a different bay and then place those arriving containers on the cargo staging structure. This bi-directional capability improves the efficiency of the loading/unloading process. Additionally, with some coordination, the configurations presented herein allow for the operation of two or more cargo loader vehicles at the same time to more quickly unload and load the storage structure within a primary transport vehicle.

The cargo transfer system presented herein includes a cargo transfer pallet capable of supporting a plurality of cargo containers thereon, a cargo loader vehicle capable of receiving the cargo transfer pallet thereon, and a cargo staging structure capable of receiving the cargo transfer pallet thereon and capable of receiving the cargo loader vehicle therein such that the cargo transfer pallet is supported by the cargo staging structure over at least a portion of the cargo loader vehicle.

The cargo transfer pallet further includes registration pins operative to engage corner fittings of a cargo container and restrain movement of the cargo container when engaged with the registration pins, and a pallet translating alignment device including one of a groove or a rail capable of providing linear translation of the cargo transfer pallet on the cargo loader vehicle by engaging one of a corresponding rail or groove on the cargo loader vehicle. The cargo transfer system may further include a registration pin retraction mechanism operative to move between a fully retracted position and a projected position within the cargo transfer pallet, the corner fittings of the cargo container being released from engagement with the registration pins of the cargo transfer pallet when the registration pins are retracted into the cargo transfer pallet. Or in the alternative, the cargo transfer system may further include an elevating mechanism being operative to vertically raise and lower the cargo container on the cargo transfer pallet, the cargo container being raised above a top portion of the registration pins to thereby release the cargo container from engagement with the registration pins of the cargo transfer pallet when the elevating mechanism raises the cargo container.

The cargo loader vehicle further includes a powered translation support bed disposed on an upper portion of the cargo loader vehicle capable of engaging the cargo transfer pallet and translating the cargo transfer pallet in a linear direction, and a cargo loader vehicle translation alignment device including one of a groove or a rail capable of providing linear translation to the cargo transfer pallet on the powered translation support bed by engaging one of a corresponding rail or groove on the cargo transfer pallet. Additionally, the cargo loader vehicle further includes an elevating mechanism capable of vertically moving the powered translation support bed between a lowest position and a highest position, a cab disposed below a height of the lowest position of the powered translation support bed, and a wheel assembly for steering and moving the cargo loader vehicle responsive to an operator in the cab.

The cargo staging structure further includes opposing support members operative to engage opposite sides of the cargo transfer pallet at upper ends of the opposing support members, and a cargo loader vehicle area laterally defined between the opposing support members and below the upper ends of the opposing support members, the cargo loader vehicle area capable of receiving the cargo loader vehicle therein under a cargo transfer pallet supported by the upper ends of the opposing support members. The cargo staging structure further includes a registration member disposed at each of the upper ends of the opposing support members capable of self-registering the opposite sides of the cargo transfer pallet there between, where the opposing support members further include a plurality of pairs of opposing support members being separated by a distance approximately equal to a unit length of a cargo container.

Figure 24:
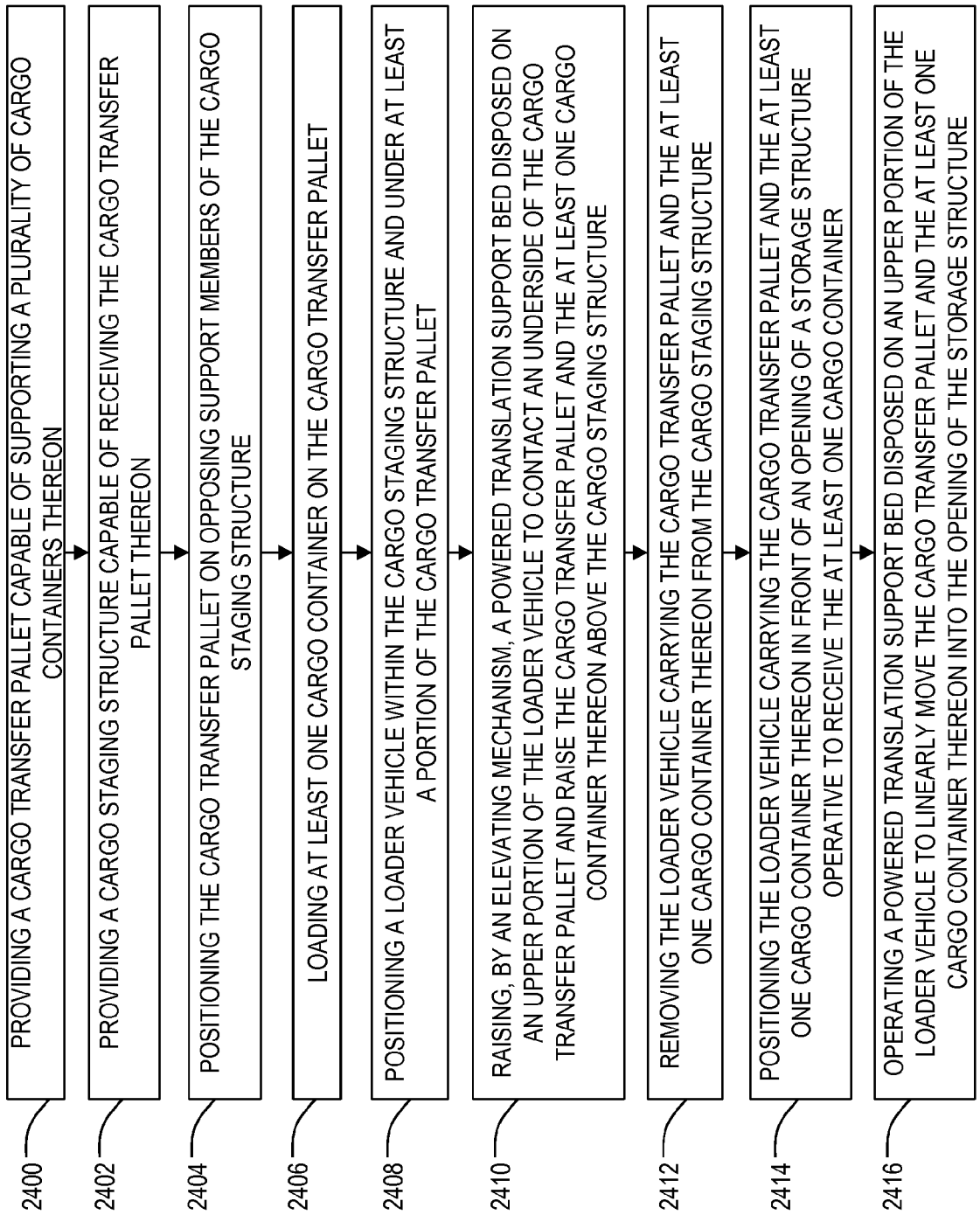
FIG. 24 illustrates a logic flow diagram of at least one configuration of a method disclosed herein of transferring cargo containers to and from a multiple-container storage structure.

FIG. 24 illustrates a logic flow diagram of at least one configuration of a method disclosed herein of transferring cargo containers to and from a multiple-container storage structure. The method includes providing a cargo transfer pallet capable of supporting a plurality of cargo containers thereon 2400, and proceeds to a cargo staging structure capable of receiving the cargo transfer pallet thereon 2402. The cargo transfer pallet is positioned on opposing support members of the cargo staging structure 2404 and proceeds to at least one cargo container being loaded on the cargo transfer pallet 2406. A cargo loader vehicle is positioned within the cargo staging structure under at least a portion of the cargo transfer pallet 2408, where a powered translation support bed proceeds to be raised by an elevating mechanism being disposed on an upper portion of the cargo loader vehicle to contact an underside of the cargo transfer pallet and raise the cargo transfer pallet and the at least one cargo container thereon above the cargo staging structure 2410. The cargo loader vehicle carrying the cargo transfer pallet and the at least one cargo container thereon proceeds to be removed or driven away from the cargo staging structure 2412.

The cargo loader vehicle carrying the cargo transfer pallet and the at least one cargo container thereon is positioned in front of an opening of a storage structure operative to receive the at least one cargo container 2414. The powered translation support bed disposed on an upper portion of the cargo loader vehicle proceeds to be operated to linearly move the cargo transfer pallet and the at least one cargo container thereon into the opening of the storage structure 2416.

The at least one cargo container is received within the storage structure on the cargo transfer pallet, and corner fittings of the at least one cargo container are engaged with a storage structure retention system. Thereafter, the cargo transfer pallet is released from an underside of the at least one cargo container within the storage structure. In a first configuration, registration pins of the cargo transfer pallet are retracted away from the at least one cargo container to operatively disengage from the corner fittings of the at least one cargo container, where the registration pins operatively engaged with the corner fittings of the at least one cargo container in a projected position as the at least one cargo container is being received within the storage structure. In a second alternative configuration, the at least one cargo container is elevated above an upper surface of the cargo transfer pallet by an elevating mechanism within one of the cargo transfer pallet or the storage structure, such that registration pins of the cargo transfer pallet are operatively disengaged with the corner fittings of the at least one cargo container, and where the registration pins operatively engaged with the corner fittings of the at least one cargo container as the at least one cargo container is being received within the storage structure.

A powered translation storage structure mechanism may be activated and is operative to assist under powered control the receiving of the at least one cargo container within the storage structure on the cargo transfer pallet. The cargo transfer pallet is then translated out of the storage structure and onto the powered translation support bed of the cargo loader vehicle under powered control of the powered translation storage structure mechanism.

Figure 25:
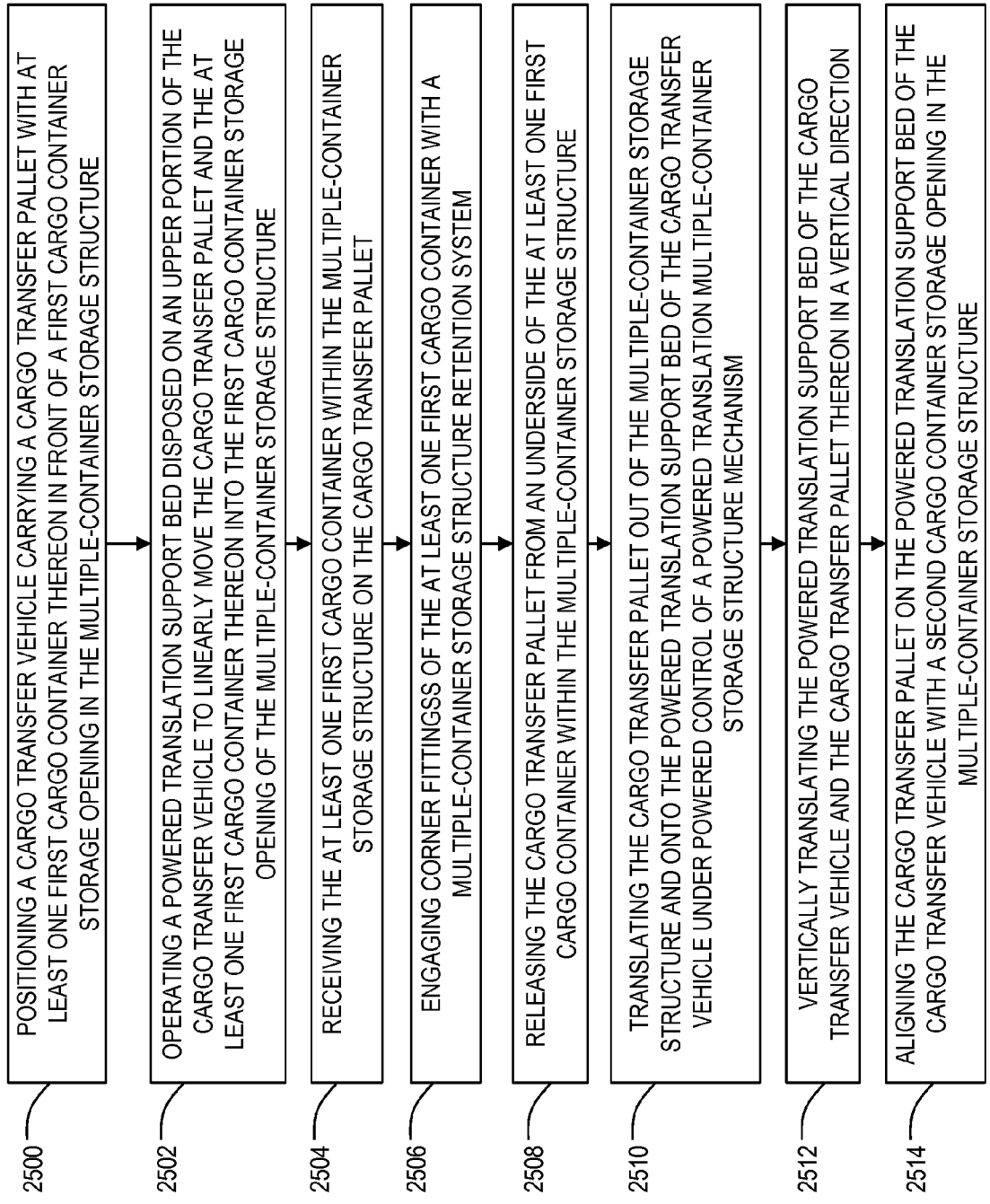
FIG. 25 illustrates another logic flow diagram of at least one other configuration of a method disclosed herein of transferring cargo containers to and from a multiple-container storage structure.

FIG. 25 illustrates another logic flow diagram of at least one other configuration of a method disclosed herein of transferring cargo containers to and from a multiple-container storage structure. The method includes positioning a cargo transfer vehicle carrying a cargo transfer pallet with at least one first cargo container thereon in front of a first cargo container storage opening in the multiple-container storage structure 2500. A powered translation support bed disposed on an upper portion of the cargo transfer vehicle proceeds to be operated to linearly move the cargo transfer pallet and the at least one first cargo container thereon into the first cargo container storage opening of the multiple-container storage structure 2502. The at least one first cargo container within the multiple-container storage structure proceeds to be received on the cargo transfer pallet 2504, and corner fittings of the at least one first cargo container are engaged with a multiple-container storage structure retention system 2506.

The cargo transfer pallet is then released from an underside of the at least one first cargo container within the multiple-container storage structure 2508, and the cargo transfer pallet proceeds to be translated out of the multiple-container storage structure and onto the powered translation support bed of the cargo transfer vehicle under powered control of a powered translation multiple-container storage structure mechanism 2510.

The powered translation support bed of the cargo transfer vehicle and the cargo transfer pallet thereon proceed to be translated in a vertical direction 2512, and the cargo transfer pallet on the powered translation support bed of the cargo transfer vehicle proceeds to be aligned with a second cargo container storage opening in the multiple-container storage structure 2514.

The method further includes operating the powered translation support bed 56 to linearly move the cargo transfer pallet 30 into the second cargo container storage 74 opening of the multiple-container storage structure 70, and aligning the cargo transfer pallet 30 within the second cargo container storage opening 74 underneath at least one second cargo container 28. Corner fittings 24 of the at least one second cargo container 28 are then engaged with registration pins 32 of the cargo transfer pallet 30 while corner fittings 24 of the second cargo container 28 are disengaged from the multiple-container storage structure retention system, and the cargo transfer pallet 30 and the at least one second cargo container 28 thereon are translated out of the multiple-container storage structure and onto the powered translation support bed 56 of the cargo transfer vehicle 50 under powered control of the powered translation multiple-container storage structure mechanism.

The configurations described herein enable efficient cargo handling and loading for cargo airplanes and vessels that carry ISO containers. The use of ISO containers instead of typical air cargo containers avoids unloading and repackaging of cargo twice for each flight or passage (once upon arrival at the departure airport, once at the arrival airport). The configurations described herein further reduce the amount of labor needed to load and unload a large cargo airplane or vessel.

The methods presented herein enable ISO containers to be loaded into an airplane more quickly than existing systems can load ISO containers into existing airplanes. The methods presented herein enable a very large and heavy payload to be loaded and secured within an airplane more quickly than smaller and lighter loads can be loaded and secured within existing airplanes. The methods presented herein require less labor per unit load than existing air cargo systems. Furthermore, when accounting for the time spent storing and moving air cargo containers and pallets, the subject disclosure provides a substantial labor advantage. Storage of cargo containers may take place outdoors. Existing air cargo is generally stored indoors in a costly facility.

The subject matter described above is provided by way of illustration only and should not be construed as limiting. Various modifications and changes may be made to the subject matter described herein without following the example configurations and applications illustrated and described, and without departing from the true spirit and scope of the present disclosure, which is set forth in the following claims.

The invention claimed is:

1. A method of transferring cargo containers, the method comprises:
   providing a cargo transfer pallet capable of supporting a plurality of cargo containers thereon;
   providing a cargo staging structure capable of receiving the cargo transfer pallet thereon;
   positioning the cargo transfer pallet on a plurality of opposing support members of the cargo staging structure;
   loading at least one cargo container on the cargo transfer pallet;
   positioning a cargo loader vehicle within the cargo staging structure and under at least a portion of the cargo transfer pallet;
   raising, by an elevating mechanism, a powered translation support bed sized according to an approximate length of the cargo loader vehicle and a corresponding length of the cargo transfer pallet and configured to translate the cargo transfer pallet linearly in a forward and an aft direction while restricting lateral movement, the powered translation support bed disposed on an upper portion of the cargo loader vehicle to contact an underside of the cargo transfer pallet and raise the cargo transfer pallet and the at least one cargo container thereon above the cargo staging structure; and
   removing the cargo loader vehicle carrying the cargo transfer pallet and the at least one cargo container thereon from the cargo staging structure.

2. The method of transferring cargo according to claim 1, further comprises:
   positioning the cargo loader vehicle carrying the cargo transfer pallet and the at least one cargo container thereon in front of an opening of a storage structure operative to receive the at least one cargo container; and
   operating a powered translation support bed disposed on an upper portion of the cargo loader vehicle to linearly move the cargo transfer pallet and the at least one cargo container thereon into the opening of the storage structure.

3. The method of transferring cargo according to claim 2, further comprises:
   receiving the at least one cargo container within the storage structure on the cargo transfer pallet;
   engaging a plurality of corner fittings of the at least one cargo container with a storage structure retention system; and
   releasing the cargo transfer pallet from an underside of the at least one cargo container within the storage structure.

4. The method of transferring cargo according to claim 3, wherein releasing the cargo transfer pallet from the underside of the at least one cargo container within the storage structure further comprises retracting a plurality of registration pins of the cargo transfer pallet away from the at least one cargo container to operatively disengage from the plurality of corner fittings of the at least one cargo container.

5. The method of transferring cargo according to claim 3, wherein releasing the cargo transfer pallet from the underside of the at least one cargo container within the storage structure further comprises elevating the at least one cargo container above an upper surface of the cargo transfer pallet by an elevating mechanism within one of the cargo transfer pallet or the storage structure, such that a plurality of registration pins of the cargo transfer pallet are operatively disengaged with the plurality of corner fittings of the at least one cargo container.

6. The method of transferring cargo according to claim 3, further comprises:
   operating a powered translation storage structure mechanism operative to assist under powered control the receiving of the at least one cargo container within the storage structure on the cargo transfer pallet.

7. The method of transferring cargo according to claim 6, further comprises:
   translating the cargo transfer pallet out of the storage structure and onto the powered translation support bed of the cargo loader vehicle under powered control of the powered translation storage structure mechanism.

8. A method of handling cargo containers within a multiple-container storage structure, the method comprises:
   positioning a cargo transfer vehicle carrying a cargo transfer pallet with at least one first cargo container thereon in front of a first cargo container storage opening in the multiple-container storage structure;
   operating a powered translation support bed disposed on an upper portion of the cargo transfer vehicle to linearly move the cargo transfer pallet and the at least one first cargo container thereon into the first cargo container storage opening of the multiple-container storage structure;
   receiving the at least one first cargo container within the multiple-container storage structure on the cargo transfer pallet;
   engaging a plurality of corner fittings of the at least one first cargo container with a multiple-container storage structure retention system;
   releasing the cargo transfer pallet from an underside of the at least one first cargo container within the multiple-container storage structure; and
   translating the cargo transfer pallet out of the multiple-container storage structure and onto the powered translation support bed of the cargo transfer vehicle under powered control of a powered translation multiple-container storage structure mechanism.

9. The method of handling cargo containers according to claim 8, further comprises:
   translating the powered translation support bed of the cargo transfer vehicle and the cargo transfer pallet thereon in a vertical direction; and
   aligning the cargo transfer pallet on the powered translation support bed of the cargo transfer vehicle with a second cargo container storage opening of the multiple-container storage structure.

10. The method of handling cargo containers according to claim 9, further comprises:
    operating the powered translation support bed to linearly move the cargo transfer pallet into the second cargo container storage opening of the multiple-container storage structure; and
    aligning the cargo transfer pallet within the second cargo container storage opening underneath at least one second cargo container.

11. The method of handling cargo containers according to claim 10, further comprises:

engaging the plurality of corner fittings of the at least one second cargo container with a plurality of registration pins of the cargo transfer pallet;

disengaging the plurality of corner fittings of the at least one second cargo container from the multiple-container storage structure retention system; and translating the cargo transfer pallet and the at least one second cargo container thereon out of the multiple-container storage structure and onto the powered translation support bed of the cargo transfer vehicle under powered control of the powered translation multiple-container storage structure mechanism.

12. The method of handling cargo containers according to claim 8, wherein releasing the cargo transfer pallet from the underside of the at least one first cargo container within the multiple-container storage structure further comprises retracting a plurality of registration pins of the cargo transfer pallet away from the at least one first cargo container to operatively disengage from the plurality of corner fittings of the at least one first cargo container.

13. The method of handling cargo containers according to claim 8, wherein releasing the cargo transfer pallet from the underside of the at least one first cargo container within the multiple-container storage structure further comprises elevating the at least one first cargo container above an upper surface of the cargo transfer pallet by an elevating mechanism within one of the cargo transfer pallet or the multiple-container storage structure, such that a plurality of registration pins of the cargo transfer pallet are operatively disengaged from the plurality of corner fittings of the at least one first cargo container.

14. A method of transferring cargo containers, the method comprises:

providing a cargo transfer pallet capable of supporting a plurality of cargo containers thereon;

providing a cargo staging structure capable of receiving the cargo transfer pallet thereon;

positioning the cargo transfer pallet on a plurality of opposing support members of the cargo staging structure;

loading at least one cargo container on the cargo transfer pallet;

positioning a cargo loader vehicle within the cargo staging structure and under at least a portion of the cargo transfer pallet;

raising, by an elevating mechanism, a powered translation support bed disposed on an upper portion of the cargo loader vehicle to contact an underside of the cargo transfer pallet and raise the cargo transfer pallet and the at least one cargo container thereon above the cargo staging structure;

removing the cargo loader vehicle carrying the cargo transfer pallet and the at least one cargo container thereon from the cargo staging structure;

positioning the cargo loader vehicle carrying the cargo transfer pallet and the at least one cargo container thereon in front of an opening of a storage structure operative to receive the at least one cargo container; and operating a powered translation support bed disposed on an upper portion of the cargo loader vehicle to linearly move the cargo transfer pallet and the at least one cargo container thereon into the opening of the storage structure.

15. The method of transferring cargo according to claim 14, further comprises:

receiving the at least one cargo container within the storage structure on the cargo transfer pallet;

engaging a plurality of corner fittings of the at least one cargo container with a storage structure retention system; and releasing the cargo transfer pallet from an underside of the at least one cargo container within the storage structure.

16. The method of transferring cargo according to claim 15, wherein releasing the cargo transfer pallet from the underside of the at least one cargo container within the storage structure further comprises retracting a plurality of registration pins of the cargo transfer pallet away from the at least one cargo container to operatively disengage from the plurality of corner fittings of the at least one cargo container.

17. The method of transferring cargo according to claim 15, wherein releasing the cargo transfer pallet from the underside of the at least one cargo container within the storage structure further comprises elevating the at least one cargo container above an upper surface of the cargo transfer pallet by an elevating mechanism within one of the cargo transfer pallet or the storage structure, such that a plurality of registration pins of the cargo transfer pallet are operatively disengaged with the plurality of corner fittings of the at least one cargo container.

18. The method of transferring cargo according to claim 15, further comprises:

operating a powered translation storage structure mechanism operative to assist under powered control the receiving of the at least one cargo container within the storage structure on the cargo transfer pallet.

19. The method of transferring cargo according to claim 18, further comprises:

translating the cargo transfer pallet out of the storage structure and onto the powered translation support bed of the cargo loader vehicle under powered control of the powered translation storage structure mechanism.

* * * * *